United States Patent
Cable

(10) Patent No.: US 8,077,365 B2
(45) Date of Patent: Dec. 13, 2011

(54) HOLOGRAPHIC IMAGE DISPLAY SYSTEM

(75) Inventor: Adrian Cable, Harlton (GB)

(73) Assignee: Light Blue Optics Ltd, Cambridge, Cambridgeshire (GB)

(*) Notice: Subject to any disclaimer, the term of this patent is extended or adjusted under 35 U.S.C. 154(b) by 727 days.

(21) Appl. No.: 12/182,095

(22) Filed: Jul. 29, 2008

(65) Prior Publication Data

US 2010/0014134 A1  Jan. 21, 2010

(30) Foreign Application Priority Data

Jul. 16, 2008 (GB) .................................. 0813009.8

(51) Int. Cl.
*G03H 1/08* (2006.01)
*G03H 1/04* (2006.01)

(52) U.S. Cl. ................. 359/9; 359/32; 359/35; 382/276

(58) Field of Classification Search ............... 359/9, 32, 359/35; 382/276
See application file for complete search history.

(56) References Cited

U.S. PATENT DOCUMENTS 3,779,492 A    12/1973  Grumet
6,809,845 B1 * 10/2004  Kim et al. .................... 359/9

FOREIGN PATENT DOCUMENTS

WO   WO 02/39389 A1    5/2002
WO   WO 2005/059659 A2  6/2005

OTHER PUBLICATIONS

International Search Report for International Application No. GB0813009.8, dated Nov. 14, 2008.

* cited by examiner

*Primary Examiner* — Audrey Y Chang
(74) *Attorney, Agent, or Firm* — Knobbe, Martens, Olson & Bear, LLP

(57) ABSTRACT

This invention relates to holographic image display systems, and to related methods and processor control code. We describe a method of displaying an image holographically, the method including: inputting display image data defining said image for display; processing said image data to determine first image data representing a first spatial frequency portion of said image data and second image data representing a second spatial frequency portion of said image data, wherein said second spatial frequency is higher than said first spatial frequency; displaying a hologram of said first image data on a spatial light modulator (SLM) to form a holographically-generated intermediate real image; modulating said intermediate real image using said second image data to display said image.

15 Claims, 15 Drawing Sheets

$D = 1.0$ (DE = 0.333)

$D = 1.3$ (DE = 0.433)

$D = 1.5$ (DE = 0.496)

$D = 2.0$ (DE = 0.569)

$D = 4.0$ (DE = 0.619)

$D = 8.0$ (DE = 0.660)

HOLOGRAPHIC IMAGE DISPLAY SYSTEM

CLAIM OF PRIORITY

This application claims priority under 35 U.S.C. §119 to United Kingdom Application No. 0813009.8, filed Jul. 16, 2008, which is incorporated in its entirety by reference herein.

BACKGROUND OF THE INVENTION

1. Field of the Invention

This invention relates to holographic image display systems, and to related methods and processor control code.

2. Description of the Related Art

We have previously described techniques for displaying an image holographically—see, for example, WO 2005/059660 (Noise Suppression Using One Step Phase Retrieval), WO 2006/134398 (Hardware for OSPR), WO 2007/031797 (Adaptive Noise Cancellation Techniques), WO 2007/110668 (Lens Encoding), and WO 2007/141567 (Colour Image Display). These are all hereby incorporated by reference in their entirety.

Advantages of holographic image display techniques include a compact optical system and increased optical efficiency as compared with conventional display systems. However the techniques we have previously described are relatively computationally expensive when displaying high-resolution images and, in a hardware (ASIC) implementation the resolution is closely tied to the hardware configuration. In an OSPR-type approach, where multiple spatially-coincident temporal holographic subframes are displayed for each image frame, the power consumption may be reduced by employing multi-phase rather than binary phase modulation, but nonetheless further power savings are desirable. Depending upon the implementation of the technique, more SLM (Spatial Light Modulator) pixels may be employed than are seen as image pixels, which can increase cost and make miniaturisation difficult. A high contrast image display can also be difficult to achieve.

It is therefore desirable to be able to increase the efficiency and image quality of holographic image display systems, and to further reduce their size.

SUMMARY OF THE INVENTION

According to a first aspect of the present invention there is therefore provided a method of displaying an image holographically, the method comprising: inputting display image data defining said image for display; processing said image data to determine first image data representing a first spatial frequency portion of said image data and second image data representing a second spatial frequency portion of said image data, wherein said second spatial frequency is higher than said first spatial frequency; displaying a hologram of said first image data on a spatial light modulator (SLM) to form a holographically generated intermediate real image; modulating said intermediate real image using said second image data to display said image.

In embodiments of the method the resolution of an SLM displaying the hologram may be relatively low (lower than that of an SLM intensity modulating the intermediate real image), and therefore computation of the hologram becomes straightforward, especially when using an OSPR-type approach such as ADOSPR (adaptive OSPR). In a hardware implementation a small, cheap and very low power ASIC (Application Specific Integrated Circuit) may be employed. Simulations have shown that an SLM resolution of 64×64, or even lower, may be sufficient for the hologram.

In embodiments of the method the resolution of an SLM displaying the hologram may be selected substantially independently of a desired resolution of the image. Thus the resolution of the SLM hologram may be selected simply dependent on the typical proportion of image energy contained within its low frequency components. Increasing the resolution of video images adds energy to high frequency components but does not substantially change the low frequency content. Thus the resolution of an image projection system embodying the method may be changed, for example increased without modifying the hologram SLM or the associated hologram data processing. Therefore in embodiments in which the hologram data processing is performed by dedicated hardware such as an ASIC, the projector resolution may be increased without modifying, or without substantially modifying, the ASIC.

Embodiments of the method are able to provide a high contrast display since residual background noise, which is of low energy but perceptually significant, is substantially blocked an imaging SLM modulating the intermediate real image using the second image data. In embodiments of the method no error diffusion (such as that we have described in previous patent applications) is employed to reduce background noise, thus further reducing the computational cost.

A holographic image projector embodying the method can be readily miniaturisable. This is because the SLM displaying the hologram has a relatively small active area due to its low resolution (smaller than the image resolution) and therefore physically small illumination optics may be employed. Further there is no particular need for pixels of the SLM displaying the hologram to have a very small lateral dimension in order to shrink the illumination optics. Thus, for example, the illumination optics can be very small even with the current generation of SLMs which feature for example 5.62 μm pixels.

Since the intermediate real image is intensity modulated, in embodiments by an intensity modulating SLM of a higher resolution that a phase modulating SLM displaying a hologram, in embodiments a proportion of the light of the intermediate real image is blocked by the imaging (intensity modulating) SLM, to form the image. However this is much less than the light blocked in a conventional imaging system, and although the system may be slightly less optically efficient than a "pure" holographic projector the overall system efficiency can be significantly higher due to the considerably reduced computational requirements.

In embodiments of a holographic image projector embodying the method (as described further below) alignment between an SLM displaying the hologram and an SLM modulating the intermediate real image produced by the hologram is important. Very broadly speaking, the hologram forms a low resolution intermediate real image which is intensity modulated using a higher resolution SLM to add the high frequency spatial components not present in the image formed by the hologram. Ideally therefore the alignment between the intensity modulating SLM and the SLM displaying the hologram should be to within one to two pixels of the intensity modulating SLM—that is the intensity modulating SLM adding the high frequency components should have pixels which line up within one to two pixels with the pixel boundaries of the intermediate real image formed by displaying the hologram. In practice, however, the mechanical alignment requirements can be relaxed with the addition of defocus and/or phase gradients to the holograms on the hologram SLM, to move the intermediate real image formed by the hologram SLM axially and laterally to the correct position on the surface of the intensity modulating SLM. (Techniques for encoding lens power into a hologram, in particular in the context of encoding one or more lenses for the optics of an OSPR-type holographic image projection system, are described in WO 2007/110668; this description is hereby incorporated by reference).

In embodiments of the method low and high spatial frequency components of the image data are extracted to provide the first (low resolution) and second (high resolution) image data. A hologram is generated from the low resolution image data such that when the hologram is displayed on the hologram SLM it reproduces a version of the low resolution image data comprising the low spatial frequencies of the image. The skilled person will understand that in embodiments displaying the hologram comprises displaying multiple, temporal subframes which noise-average to give a version of the low spatial frequency component of the image data, thus providing the intermediate real image. In general the intermediate real image will not be a precisely accurate reproduction of the low spatial frequency portion of the image data since it will have associated noise. Thus preferred embodiments of the method calculate the expected intermediate real image (including the noise) and then determine the high spatial frequency component of the image data which is to be displayed on the intensity modulating SLM as that (high spatial frequency) portion of the image data which is left over from the intermediate real image. The intensity modulation comprises, in effect, a multiplication of the intermediate real image by the pattern on the intensity modulating SLM (the second image data). Thus to determine the high spatial frequency components left over from the holographic display of the lower spatial frequency components, in embodiments the image data is divided by the intermediate real image which is calculated to be formed by the displayed hologram.

Since an intensity modulating SLM only removes light from the intermediate real image (by blocking light) in some preferred embodiments the first image data from which the hologram displayed on the hologram SLM is generated comprises a reduced resolution of the image data in which each reduced resolution pixel has a value dependent on the image pixels from which it is derived, preferably (but not necessarily) a peak value of the image pixel values from which it is derived. Using a peak value enables values of pixels of the desired image for display to be accurately represented by blocking light, but in other implementations other statistics may additionally or alternatively be employed. For example in embodiments of the method it may be useful to modify peak values used for pixels of the first image data from which the intermediate real image is holographically generated to compensate for edge effects. Thus not every image pixel need have a replacement pixel value as described.

As previously mentioned, the intermediate real image will generally have a certain amount of noise. It might be thought that to accurately represent the second (high spatial frequency) image data one would have to determine the lowest instantaneous level of a pixel in the intermediate real image and then scale the high spatial frequency information displayed on the intensity modulating SLM accordingly (since this block pixel of the intermediate real image would effectively limit the maximum light output for the corresponding portion of the desired image to display). However, depending upon the statistical properties of the noise, this could result in a relatively inefficient system if, for example, the noise resulted in one intermediate image pixel having a particularly low brightness. For this reason it is preferable to balance accurate rendition of the image with optical efficiency and therefore not necessarily to lower the maximum light output for a region of the image so that it is below an actually achievable brightness for that region of the image. Instead it may be tolerable to allow some pixels of the displayed image to have a lower than ideal value if, by doing this, the overall optical efficiency can be increased. One way of achieving this is to determine a scaling factor for the second (high frequency) image data using a calculated version of the (noisy) intermediate real image, and then to scale this scaling factor to increase the optical efficiency by blocking less light overall, at the expense of introducing a slight amount of "clipping". The skilled person will, however, appreciate that other techniques may be employed to achieve a similar result.

In some preferred embodiments of the method an OSPR-type technique is employed to display the hologram—that is the hologram is displayed by displaying a plurality of holographic subframes, each when replayed having substantially the same spatial coverage, in rapid succession to average to the desired result. This is computationally much less expensive than other techniques. However it is particularly preferred to employ an adaptive OSPR-type technique in which the (deliberately introduced) noise in each successive temporal subframe aims to at least partially compensate for noise in the replayed image arising from the display of one or more previous temporal subframes. This approach is useful because it helps to reduce the risk of "spikes" in the noise which can have the effect of pushing down the base line level of light in the displayed image, as described above. A low-level "ripple"-type noise allows a base line level which is relatively close to the median available light level at the intermediate real image whereas a spike will tend to depress the base line level, and hence the optical efficiency of the system and/or introduce noise (if, in effect, it is ignored).

In some preferred implementations the image is displayed by projecting light from the intensity modulating SLM towards a screen. Preferably, to reduce the effect of speckle, the projection optics include a diffuser at a further intermediate real image plane, in particular a plane comprising a real image from the hologram SLM modulated by the intensity modulating SLM. There is a trade off between speckle reduction and depth of field of the final projected image, depending on the diffusion angle of the diffuser: a greater angle reduces speckle, but also reduces depth of field (a diffusion angle of zero degrees, in effect if the diffuser is absent, results in a projected image which is substantially in focus at substantially all distances from the projector). In some particularly preferred embodiments the diffuser is mechanically driven, in particular using a piezoelectric actuator, for example in conjunction with a binary phase diffuser. Preferably a minimum feature size or pixel pitch of the diffuser is less than a pixel pitch of the further intermediate real image (at the diffuser). In this way speckle may be reduced at increased spatial frequencies than would otherwise be the case (with a larger pixel pitch the diffuser can have the effect of adding more OSPR-type subframes). A synergistic effect has been observed in visual noise reduction in an OSPR-type holographic image display system using a speckle reducing diffuser with pixels smaller than those of the intermediate image at which the diffuser is located. In embodiments the piezoelectric actuator may have a stroke of at least 5 µm, more preferably at least 10 µm (and/or the diffuser is preferably moved by more than 2, 5 or 10 diffuser pixels within the duration of an image frame comprising one or more temporal subframes). Further details of the application of a diffuser to OSPR-based and other types of holographic image display systems can be found in our earlier UK patent application GB 0800167.9 of 7 Jan. 2008, hereby incorporated by reference.

In preferred embodiments a multicolour, preferably a full colour image display is provided. This may be achieved by combining light from red, green and blue lasers (for example wavelengths of, broadly speaking, greater than 600 nm, 500-600 nm, and less than 500 nm). These may be combined and provided as a single, colour time-multiplexed beam to the hologram SLM. Since in embodiments the hologram SLM may have a relatively small number of pixels, for example equal to or less than 512, 256, 128, 64 or 32 pixels (in the x and/or y-direction) the active area of the hologram SLM may be relatively small, for example with a maximum lateral dimension of less than 1 mm. This facilitates shrinking the optics illuminating the hologram SLM, and hence embodiments of the holographic image display.

In a related aspect the invention provides a method of displaying an image holographically, the method comprising dividing said image into lower and higher resolution representations of said image, displaying a hologram of said lower resolution representation of said image on a phase modulator to generate a lower resolution representation of said image, and modulating an intensity of said lower resolution representation of said image using said higher resolution representation of said to display said image.

As previously mentioned, in some preferred implementations the higher resolution representation of the image is determined such that a combination of the holographically generated lower resolution representation of the image and the higher resolution representation of the image together approximate the desired image for display. The approximation need not be precisely accurate since it may be desirable deliberately to introduce a small amount of noise in order to increase the overall optical efficiency of the system by "clipping" some of the pixels in the displayed image where noise in the holographically generated image would otherwise dictate an overall reduced displayed image brightness.

In a further related aspect there is provided a holographic image display system comprising means to implement aspects and embodiments of the above-described methods.

Thus in one aspect such a system comprises means for inputting display image data, processing this to determine hologram data for displaying a low spatial frequency image and intensity modulation data for modulating the low spatial frequency image with higher spatial frequency components of the desired image for display, in order to display a desired image.

In another related aspect the invention provides a holographic image display system including means to divide the image into lower and higher resolution representations of the image, and means for displaying a hologram at a lower resolution representation and for modulating an intensity of an image replayed from the displayed hologram (or plurality of holographic subframes) in order to display the image).

In a still further related aspect the invention provides a system for displaying an image holographically, the system comprising: an input to receive display image data defining said image for display; a processor to process said image data to determine first image data representing a first spatial frequency portion of said image data and second image data representing a second spatial frequency portion of said image data, wherein said second spatial frequency is higher than said first spatial frequency; an output to output data for displaying a hologram of said first image data on a spatial light modulator (SLM) to form a holographically-generated intermediate real image; and an output to output data for modulating said intermediate real image using said second image data, to thereby display said image.

Embodiments of the above-described system may be implemented in either hardware or software or a combination of the two. A common output or separate output may be employed for driving respective phase and intensity modulating spatial light modulators for displaying the hologram and modulating the intermediate real image.

In a still further related aspect the invention provides a method of processing data for displaying an image holographically the method comprising: inputting display image data defining said image for display; processing said image data to determine first image data representing a first spatial frequency portion of said image data and second image data representing a second spatial frequency portion of said image data, wherein said second spatial frequency is higher than said first spatial frequency; generating data for displaying a hologram of said first image data on a spatial light modulator (SLM) to form a holographically-generated intermediate real image; and generating data for modulating said intermediate real image using said second image data to thereby display said image.

In embodiments the determining of the second (high spatial frequency) image data comprises calculating a reconstruction of the displayed hologram and then processing the image data using this, for example dividing by this calculated data to determine the second (higher spatial frequency) image data, that is the remaining spatial frequency component of the image data to be added to the holographically generated intermediate real image to reproduced a desired image.

In a related aspect the invention provides a carrier carrying processor control code for implementing a method as described above.

The carrier may be, for example, a disk, CD- or DVD-ROM, or programmed memory such as read-only memory (Firmware). The code (and/or data) may comprise source, object or executable code in a conventional programming language (interpreted or compiled) such as C, or assembly code, for example for general purpose computer system or a digital signal processor (DSP), or the code may comprise code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

In a still further aspect the invention provides a holographic image projection system comprising: at least one laser light source; a first spatial light modulator (SLM) to phase modulator light from said at least one laser light source; intermediate optics to provide an intermediate real image plane at which a real image produced by a hologram on said first SLM is formed; a second SLM located at said intermediate real image plane to intensity modulate said real image; and output optics to project an image of said intensity modulated real image; and wherein a resolution of said second SLM is greater than a resolution of said first SLM.

In preferred embodiments the output optics are configured to provide a second intermediate real image plane for a diffuser, as described above. In embodiments the first (phase modulating) SLM has an active area which is smaller, for example less than half the size of the second (intensity modulating) SLM. In some preferred embodiments the active area of the first SLM has a maximum lateral dimension of less than 1 mm, preferably less than 0.5 mm. In some preferred embodiments the first SLM is a multiphase SLM (with at least three quantised phase levels) rather than a binary phase SLM for efficiency (this allows suppression of a conjugate holographically generated intermediate real image).

In preferred embodiments the system includes combining optics to combine red, green and blue laser light from time-multiplexed light sources in order to provide a full colour display. The system may be combined with a controller to provide a holographic image projector as described above. In embodiments the controller provides the functions described above, and is further configured to control the optical power from the one or more laser light sources, in particular dependent upon the calculated intermediate real image from the hologram SLM and upon any scaling applied to increase the optical (diffraction) efficiency of the system.

BRIEF DESCRIPTION OF THE DRAWINGS

These and other aspects of the invention will now be further described, by way of example only, with reference to the accompanying figures in which.

DETAILED DESCRIPTION OF THE PREFERRED EMBODIMENTS

Figure 1:
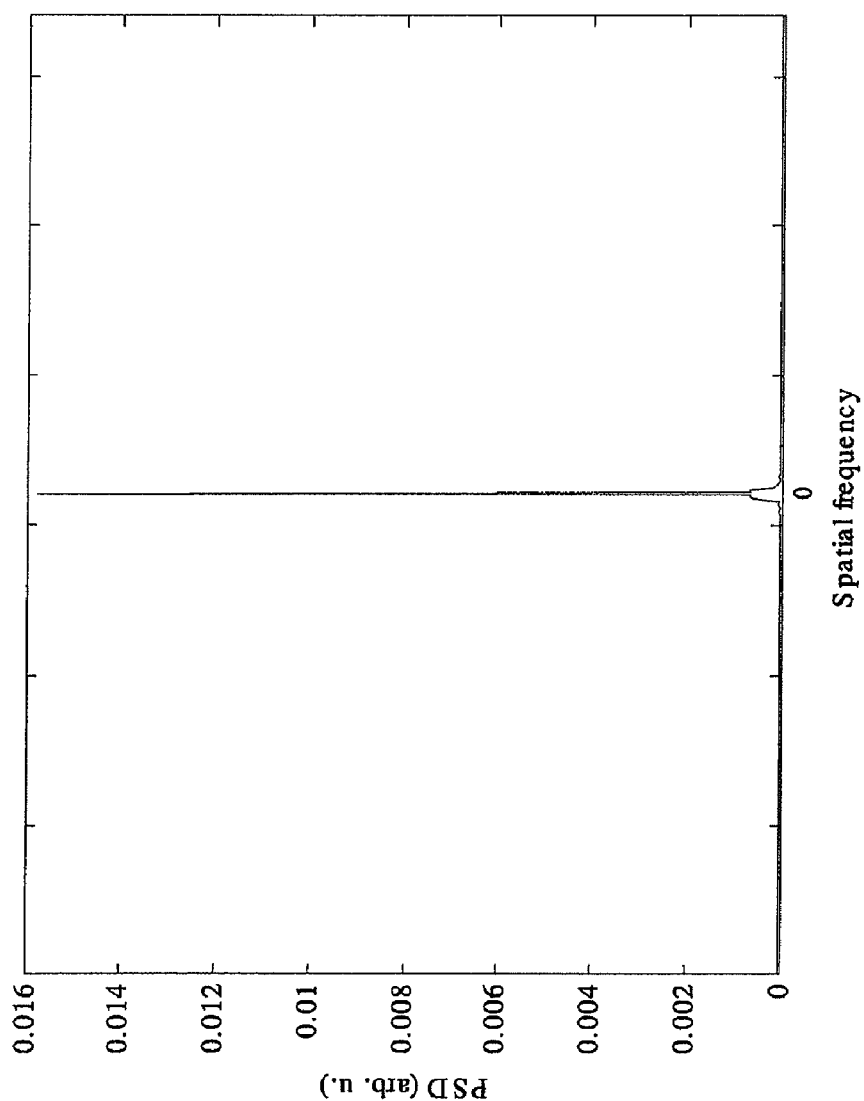
FIG. 1 shows an example image (left) and the corresponding power spectrum (right)
Figure 1:
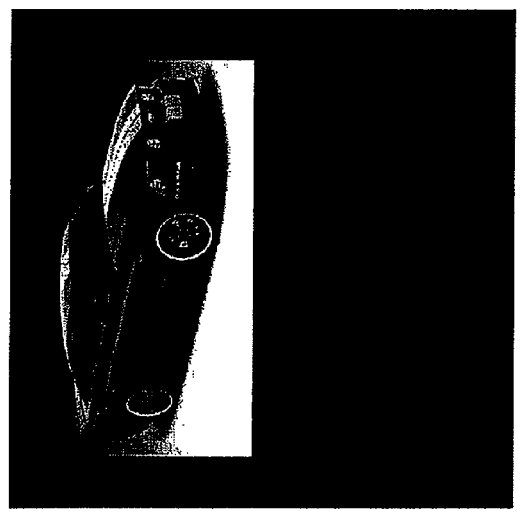

Preferred embodiments of the invention use an OSPR-type hologram generation procedure, and we therefore describe examples of such procedures below. However embodiments of the invention are not restricted to such a hologram generation procedure and may be employed with other types of hologram generation procedure including, but not limited to: a Gerchberg-Saxton procedure (R. W. Gerchberg and W. O. Saxton, "A practical algorithm for the determination of phase from image and diffraction plane pictures" Optik 35, 237-246 (1972)) or a variant thereof, Direct Binary Search (M. A. Seldowitz, J. P. Allebach and D. W. Sweeney, "Synthesis of digital holograms by direct binary search" Appl. Opt. 26, 2788-2798 (1987)), simulated annealing (see, for example, M. P. Dames, R. J. Dowling, P. McKee, and D. Wood, "Efficient optical elements to generate intensity weighted spot arrays: design and fabrication," Appl. Opt. 30, 2685-2691 (1991)), or a POCS (Projection Onto Constrained Sets) procedure (see, for example, C.-H. Wu, C.-L. Chen, and M. A. Fiddy, "Iterative procedure for improved computer-generated-hologram reconstruction," Appl. Opt. 32, 5135-(1993)). OSPR Broadly speaking in our preferred method the SLM is modulated with holographic data approximating a hologram of the image to be displayed. However this holographic data is chosen in a special way, the displayed image being made up of a plurality of temporal sub-frames, each generated by modulating the SLM with a respective sub-frame hologram, each of which spatially overlaps in the replay field (in embodiments each has the spatial extent of the displayed image).

Each sub-frame when viewed individually would appear relatively noisy because noise is added, for example by phase quantisation by the holographic transform of the image data. However when viewed in rapid succession the replay field images average together in the eye of a viewer to give the impression of a low noise image. The noise in successive temporal subframes may either be pseudo-random (substantially independent) or the noise in a subframe may be dependent on the noise in one or more earlier subframes, with the aim of at least partially cancelling this out, or a combination may be employed. Such a system can provide a visually high quality display even though each sub-frame, were it to be viewed separately, would appear relatively noisy.

The procedure is a method of generating, for each still or video frame $I=I_{xy}$, sets of N binary-phase holograms $h^{(1)} \ldots h^{(N)}$. In embodiments such sets of holograms may form replay fields that exhibit mutually independent additive noise. An example is shown below:

1. Let $G_{xy}^{(n)} = I_{xy} \exp(j\phi_{xy}^{(n)})$ where $\phi_{xy}^{(n)}$ is uniformly distributed betweeen 0 and $2\pi$ for $1 \le n \le N/2$ and $1 \le x, y \le m$ 2. Let $g_{uv}^{(n)} = F^{-1}[G_{xy}^{(n)}]$ where $F^{-1}$ represents the two-dimensional inverse Fourier transform operator, for $1 \le n \le N/2$ 3. Let $m_{uv}^{(n)} = \Re\{g_{uv}^{(n)}\}$ for $1 \le n \le N/2$ 4. Let $m_{uv}^{(n+N/2)} = \Im\{g_{uv}^{(n)}\}$ for $1 \le n \le N/2$ 5. Let $h_{uv}^{(n)} = \begin{cases} -1 & \text{if } m_{uv}^{(n)} < Q^{(n)} \\ 1 & \text{if } m_{uv}^{(n)} \ge Q^{(n)} \end{cases}$ where $Q^{(n)} = \text{median}(m_{uv}^{(n)})$ and $1 \le n \le N$ Step 1 forms N targets $G_{xy}^{(n)}$ equal to the amplitude of the supplied intensity target $I_{xy}$, but with independent identically-distributed (i.i.t.), uniformly-random phase. Step 2 computes the N corresponding full complex Fourier transform holograms $g_{uv}^{(n)}$. Steps 3 and 4 compute the real part and imaginary part of each of the holograms, respectively. Binarisation of each of the real and imaginary parts of the holograms is then performed in step 5: thresholding around the median of $m_{uv}^{(n)}$ ensures equal numbers of −1 and 1 points are present in the holograms, achieving DC balance (by definition) and also minimal reconstruction error. The median value of $m_{uv}^{(n)}$ may be assumed to be zero with minimal effect on perceived image quality.

Figure 3A:
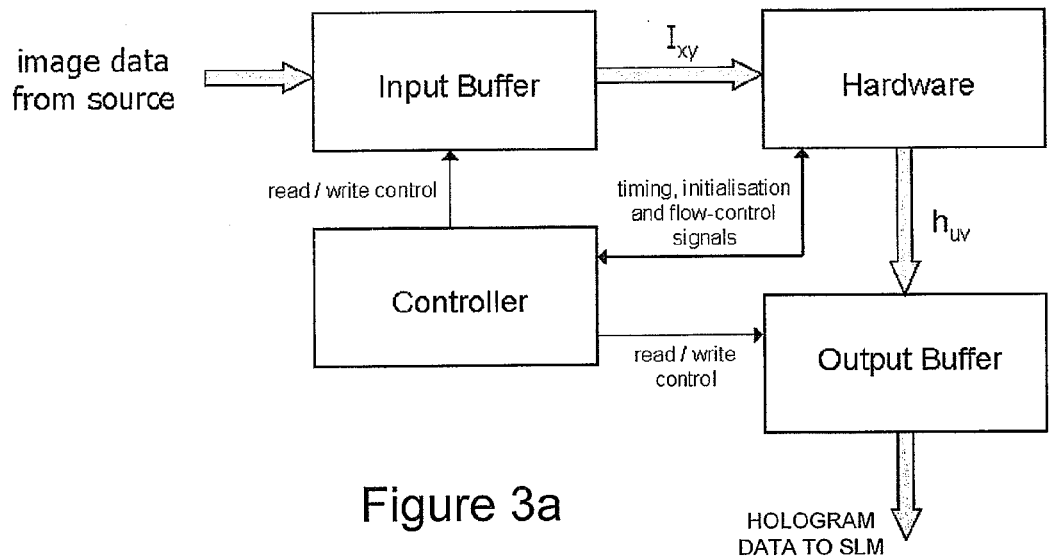
FIGS. 3a to 3d show, respectively, a block diagram of a hologram data calculation system, operations performed within the hardware block of the hologram data calculation system, energy spectra of a sample image before and after multiplication by a random phase matrix, and an example of a hologram data calculation system with parallel quantisers for the simultaneous generation of two sub-frames from real and imaginary components of complex holographic sub-frame data.

FIG. 3a, from our WO2006/134398, shows a block diagram of a hologram data calculation system configured to implement this procedure. The input to the system is preferably image data from a source such as a computer, although other sources are equally applicable. The input data is temporarily stored in one or more input buffer, with control signals for this process being supplied from one or more controller units within the system. The input (and output) buffers preferably comprise dual-port memory such that data may be written into the buffer and read out from the buffer simultaneously. The control signals comprise timing, initialisation and flow-control information and preferably ensure that one or more holographic sub-frames are produced and sent to the SLM per video frame period.

The output from the input comprises an image frame, labelled I, and this becomes the input to a hardware block (although in other embodiments some or all of the processing may be performed in software). The hardware block performs a series of operations on each of the aforementioned image frames, I, and for each one produces one or more holographic sub-frames, h, which are sent to one or more output buffer. The sub-frames are supplied from the output buffer to a display device, such as a SLM, optionally via a driver chip.

Figure 3B:
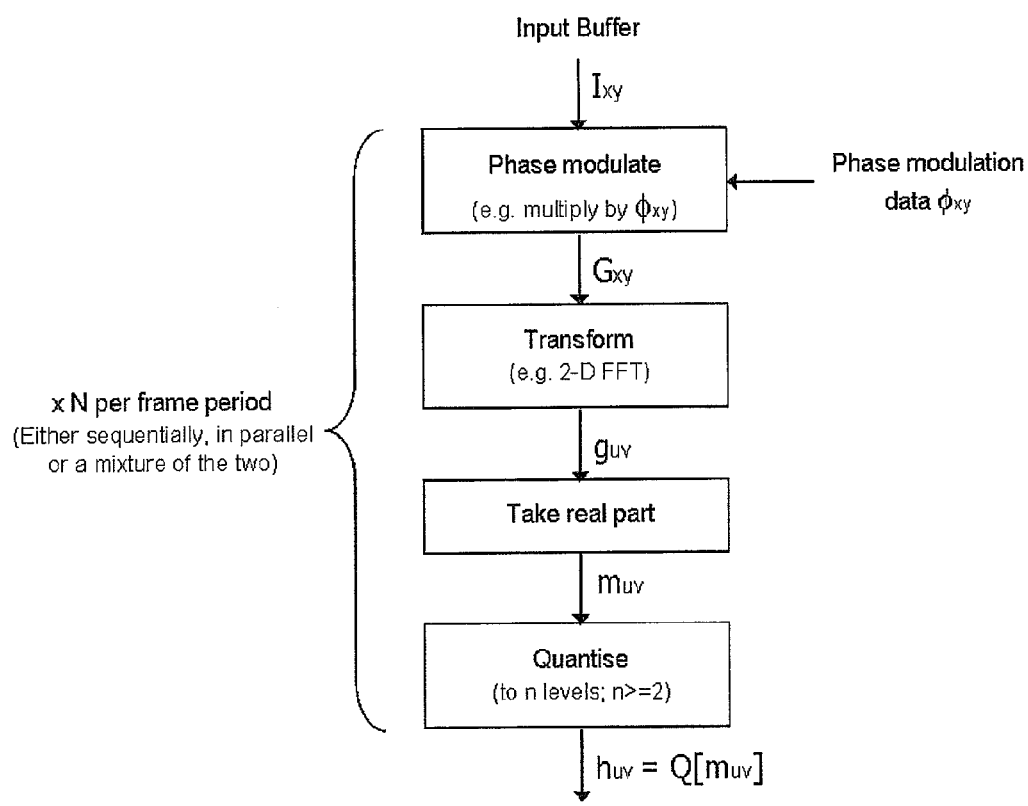

FIG. 3b shows details of the hardware block of FIG. 3a; this comprises a set of elements designed to generate one or more holographic sub-frames for each image frame that is supplied to the block. Preferably one image frame, $I_{xy}$, is supplied one or more times per video frame period as an input. Each image frame, $I_{xy}$, is then used to produce one or more holographic sub-frames by means of a set of operations comprising one or more of: a phase modulation stage, a space-frequency transformation stage and a quantisation stage. In embodiments, a set of N sub-frames, where N is greater than or equal to one, is generated per frame period by means of using either one sequential set of the aforementioned operations, or a several sets of such operations acting in parallel on different sub-frames, or a mixture of these two approaches.

Figure 3C:
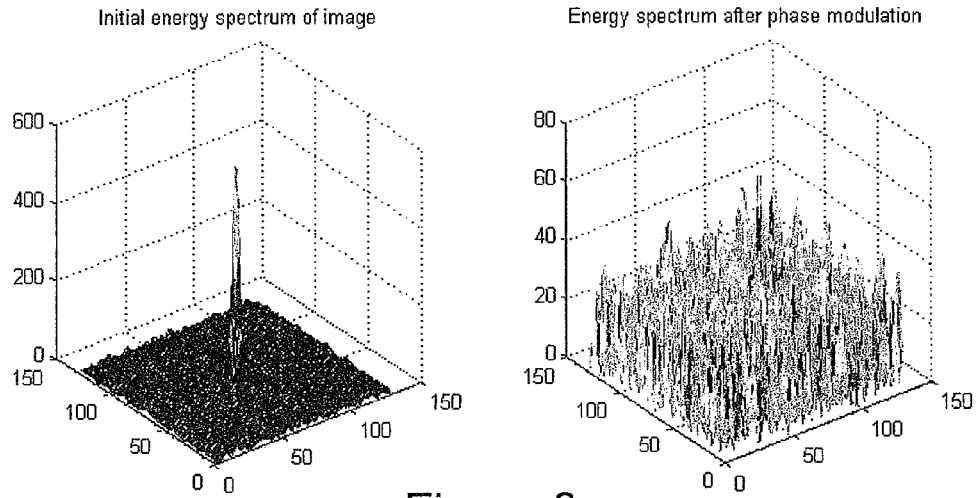

The purpose of the phase-modulation block is to redistribute the energy of the input frame in the spatial-frequency domain, such that improvements in final image quality are obtained after performing later operations. FIG. 3c shows an example of how the energy of a sample image is distributed before and after a phase-modulation stage in which a pseudo-random phase distribution is used. It can be seen that modulating an image by such a phase distribution has the effect of redistributing the energy more evenly throughout the spatial-frequency domain. The skilled person will appreciate that there are many ways in which pseudo-random binary-phase modulation data may be generated (for example, a shift register with feedback).

The quantisation block takes complex hologram data, which is produced as the output of the preceding space-frequency transform block, and maps it to a restricted set of values, which correspond to actual modulation levels that can be achieved on a target SLM (the different quantised phase retardation levels may need not have a regular distribution). The number of quantisation levels may be set at two, for example for an SLM producing phase retardations of 0 or π at each pixel.

Figure 3D:
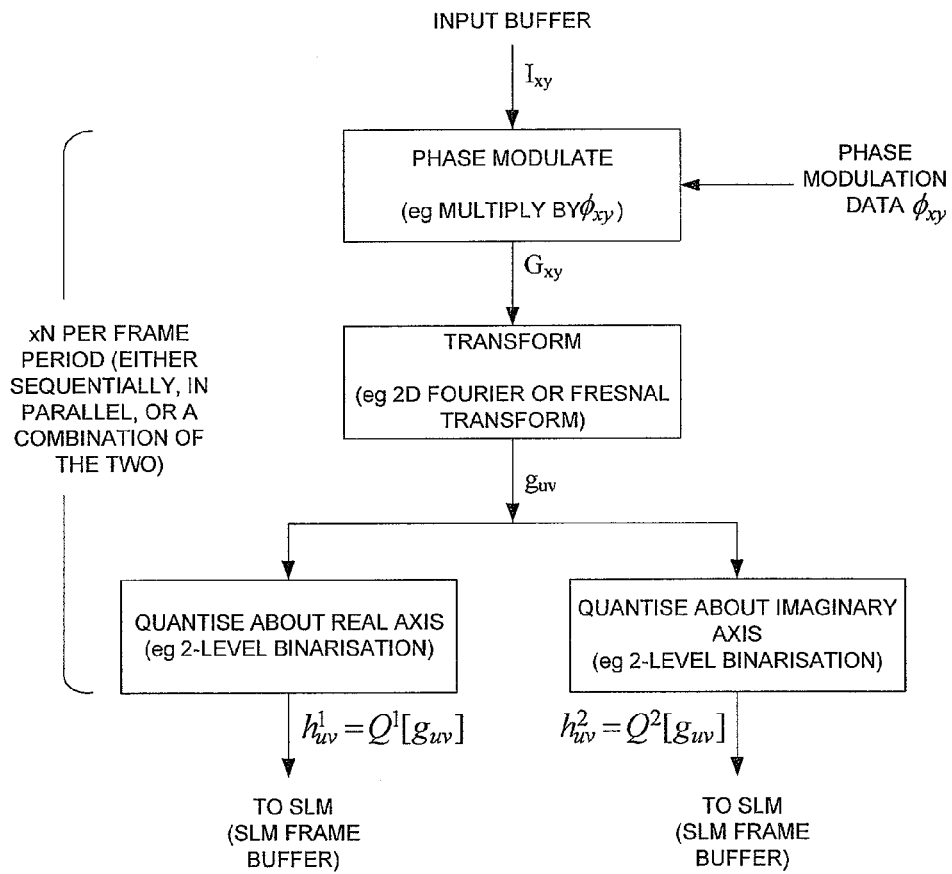

In embodiments the quantiser is configured to separately quantise real and imaginary components of the holographic sub-frame data to generate a pair of holographic sub-frames, each with two (or more) phase-retardation levels, for the output buffer. FIG. 3d shows an example of such a system. It can be shown that for discretely pixellated fields, the real and imaginary components of the complex holographic sub-frame data are uncorrelated, which is why it is valid to treat the real and imaginary components independently and produce two uncorrelated holographic sub-frames.

An example of a suitable binary phase SLM is the SXGA (1280×1024) reflective binary phase modulating ferroelectric liquid crystal SLM made by CRL Opto (Forth Dimension Displays Limited, of Scotland, UK). A ferroelectric liquid crystal SLM is advantageous because of its fast switching time. Binary phase devices are convenient but some preferred embodiments of the method use so-called multiphase spatial light modulators as distinct from binary phase spatial light modulators (that is SLMs which have more than two different selectable phase delay values for a pixel as opposed to binary devices in which a pixel has only one of two phase delay values). Multiphase SLMs (devices with three or more quantized phases) include continuous phase SLMs, although when driven by digital circuitry these devices are necessarily quantised to a number of discrete phase delay values. Binary quantization results in a conjugate image whereas the use of more than binary phase suppresses the conjugate image (see WO 2005/059660).

Adaptive OSPR

In the OSPR approach we have described above subframe holograms are generated independently and thus exhibit independent noise. In control terms, this is an open-loop system. However one might expect that better results could be obtained if, instead, the generation process for each subframe took into account the noise generated by the previous subframes in order to cancel it out, effectively "feeding back" the perceived image formed after, say, n OSPR frames to stage n+1 of the algorithm. In control terms, this is a closed-loop system.

One example of this approach comprises an adaptive OSPR algorithm which uses feedback as follows: each stage n of the algorithm calculates the noise resulting from the previously-generated holograms $H_1$ to $H_{n-1}$, and factors this noise into the generation of the hologram $H_n$ to cancel it out. As a result, it can be shown that noise variance falls as $1/N^2$. An example procedure takes as input a target image T, and a parameter N specifying the desired number of hologram sub-frames to produce, and outputs a set of N holograms $H_1$ to $H_N$ which, when displayed sequentially at an appropriate rate, form as a far-field image a visual representation of T which is perceived as high quality:

An optional pre-processing step performs gamma correction to match a CRT display by calculating $T(x, y)^{1.3}$. Then at each stage n (of N stages) an array F (zero at the procedure start) keeps track of a "running total" (desired image, plus noise) of the image energy formed by the previous holograms $H_1$ to $H_{n-1}$ so that the noise may be evaluated and taken into account in the subsequent stage: $F(x, y) := F(x, y) + |F[H_{n-1}(x, y)]|^2$. A random phase factor φ is added at each stage to each pixel of the target image, and the target image is adjusted to take the noise from the previous stages into account, calculating a scaling factor α to match the intensity of the noisy "running total" energy F with the target image energy $(T')^2$. The total noise energy from the previous n−1 stages is given by $\alpha F - (n-1)(T')^2$, according to the relation $$\alpha := \frac{\sum_{x,y} T'(x, y)^4}{\sum_{x,y} F(x, y) \cdot T'(x, y)^2}$$

and therefore the target energy at this stage is given by the difference between the desired target energy at this iteration and the previous noise present in order to cancel that noise out, i.e. $(T')^2 - [\alpha F - (n-1)(T')^2] = n(T')^2 + \alpha F$. This gives a target amplitude $|T''|$ equal to the square root of this energy value, i.e.

$$T''(x, y) := \begin{cases} \sqrt{2T'(x, y)^2 - \alpha F} \cdot \exp\{j\phi(x, y)\} & \text{if } 2T'(x, y)^2 > \alpha F \\ 0 & \text{otherwise} \end{cases}$$

At each stage n, H represents an intermediate fully-complex hologram formed from the target T" and is calculated using an inverse Fourier transform operation. It is quantized to binary phase to form the output hologram $H_n$, i.e.

$$H(x, y) := F^{-1}[T''(x, y)]$$

$$H_n(x, y) = \begin{cases} 1 & \text{if } Re[H(x, y)] > 0 \\ -1 & \text{otherwise} \end{cases}$$

Figure 4A:
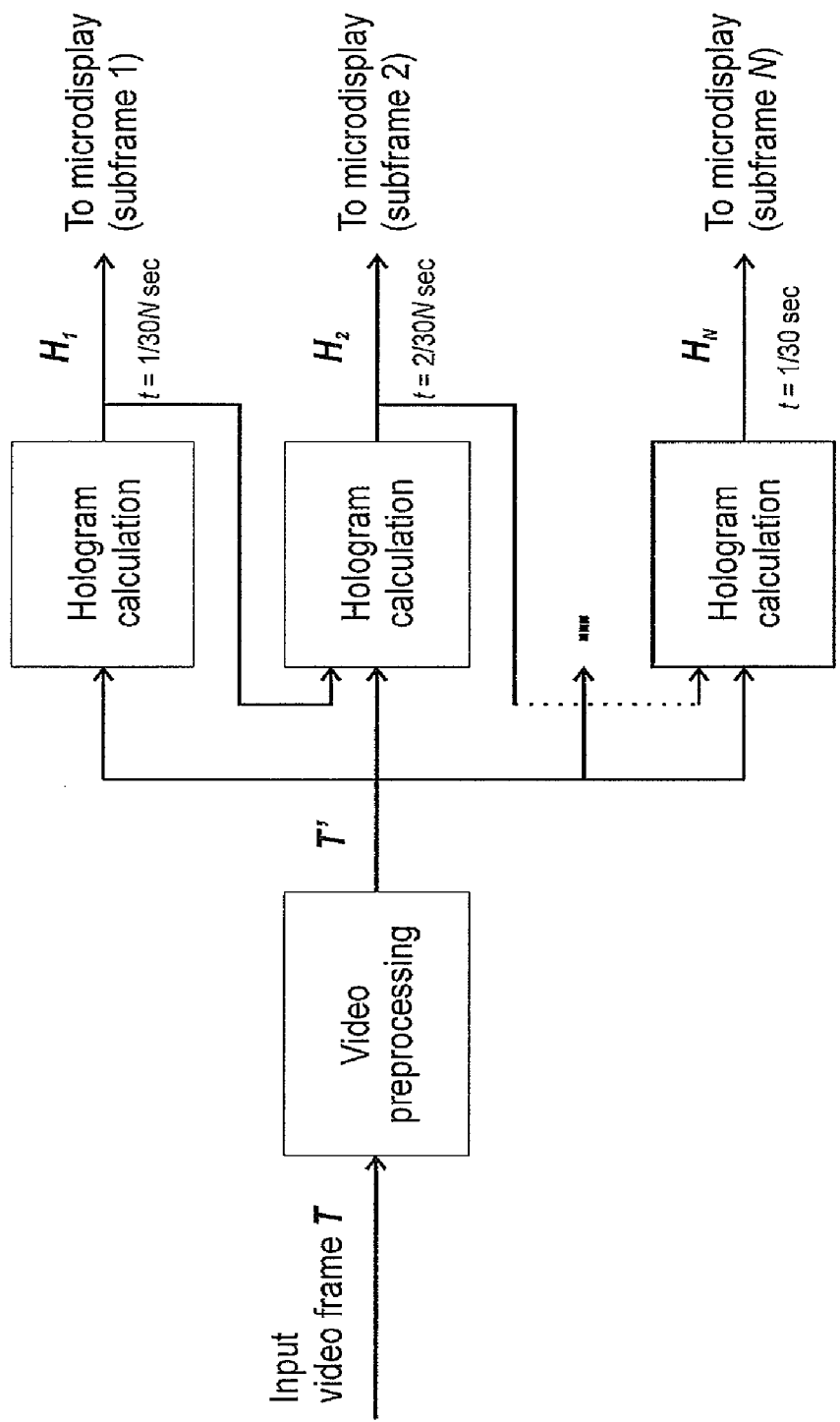
FIGS. 4a and 4b show, respectively, an outline block diagram of an adaptive OSPR-type system, and details of an example implementation of the system.
Figure 4B:
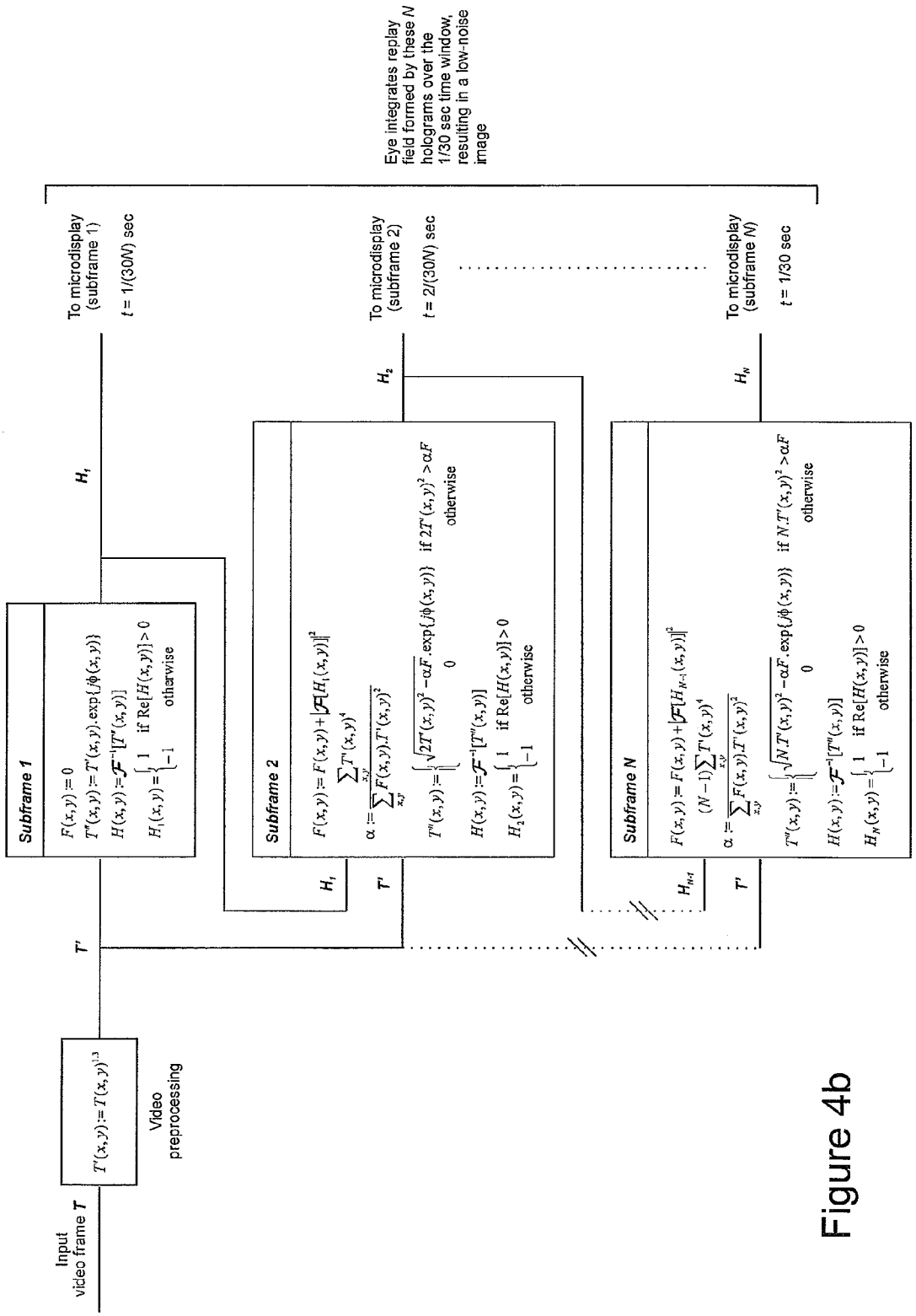

FIG. 4a outlines this method and FIG. 4b shows details of an example implementation, as described above.

Thus, broadly speaking, an ADOSPR-type method of generating data for displaying an image (defined by displayed image data, using a plurality of holographically generated temporal subframes displayed sequentially in time such that they are perceived as a single noise-reduced image), comprises generating from the displayed image data holographic data for each subframe such that replay of these gives the appearance of the image, and, when generating holographic data for a subframe, compensating for noise in the displayed image arising from one or more previous subframes of the sequence of holographically generated subframes. In embodiments the compensating comprises determining a noise compensation frame for a subframe; and determining an adjusted version of the displayed image data using the noise compensation frame, prior to generation of holographic data for a subframe. In embodiments the adjusting comprises transforming the previous subframe data from a frequency domain to a spatial domain, and subtracting the transformed data from data derived from the displayed image data.

More details, including a hardware implementation, can be found in WO2007/141567 hereby incorporated by reference.

Colour Holographic Image Projection

The total field size of an image scales with the wavelength of light employed to illuminate the SLM, red light being diffracted more by the pixels of the SLM than blue light and thus giving rise to a larger total field size. Naively a colour holographic projection system could be constructed by superimposed simply three optical channels, red, blue and green but this is difficult because the different colour images must be aligned. A better approach is to create a combined beam comprising red, green and blue light and provide this to a common SLM, scaling the sizes of the images to match one another.

Figure 5A:
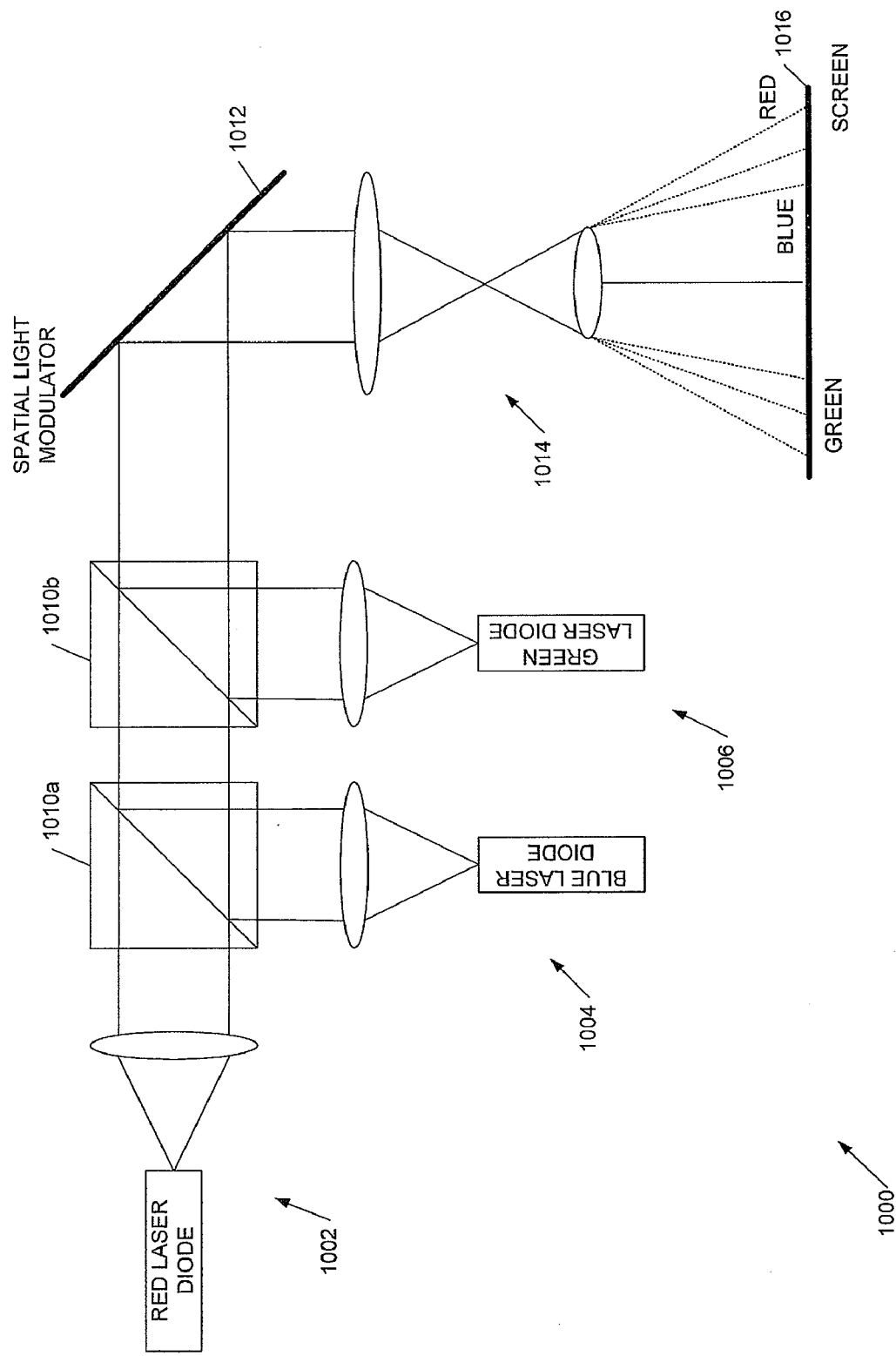
FIGS. 5a to 5c show, respectively, a colour holographic image projection system, and image, hologram (SLM) and display screen planes illustrating operation of the system.

FIG. 5a shows an example colour holographic image projection system 1000, here including demagnification optics 1014 which project the holographically generated image onto a screen 1016. Since the image is generated holographically it is in focus at substantially all distances from the optics 1014. The system comprises red 1002, green 1006, and blue 1004 collimated laser diode light sources, for example at wavelengths of 638 nm, 532 nm and 445 nm, driven in a time-multiplexed manner. Each light source comprises a laser diode 1002 and, if necessary, a collimating lens and/or beam expander. Optionally the respective sizes of the beams are scaled to the respective sizes of the holograms, as described later. The red, green and blue light beams are combined in two dichroic beam splitters 1010a, b and the combined beam is provided (in this example) to a reflective spatial light modulator 1012; the figure shows that the extent of the red field would be greater than that of the blue field. The total field size of the displayed image depends upon the pixel size of the SLM but not on the number of pixels in the hologram displayed on the SLM.

Figure 5B:
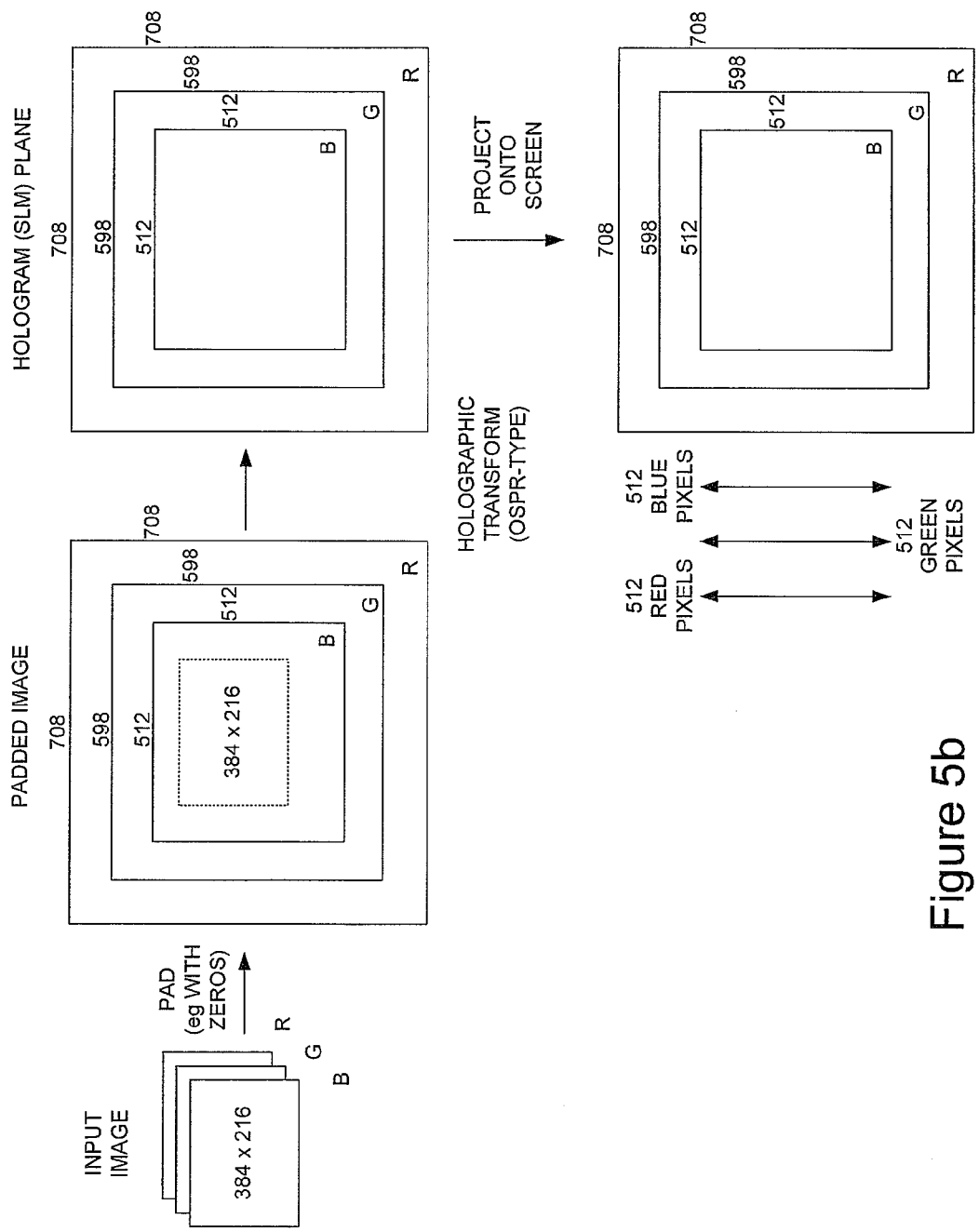
Figure 5C:
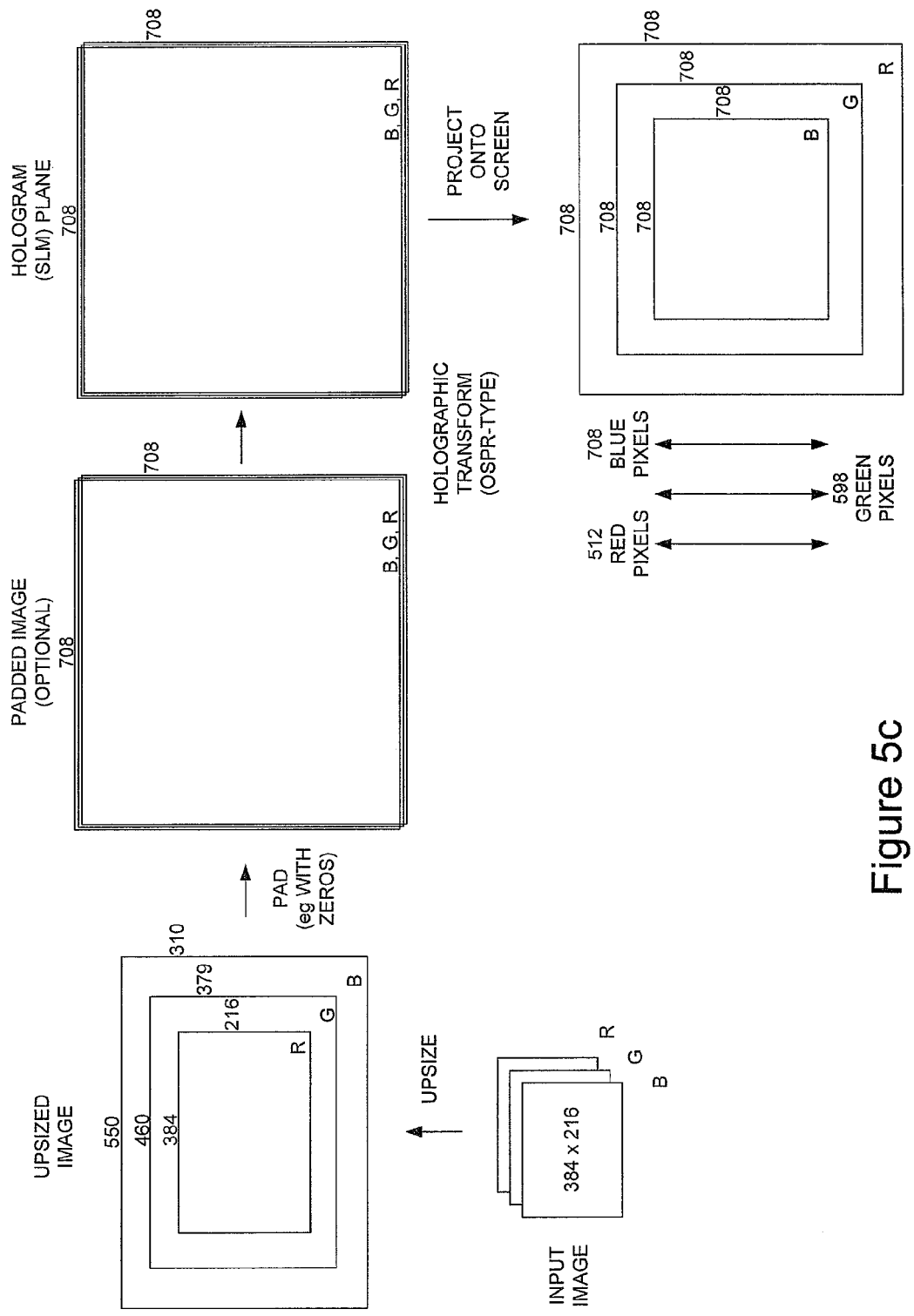

FIG. 5b shows padding an initial input image with zeros in order to generate three colour planes of different spatial extents for blue, green and red image planes. A holographic transform is then performed on these padded image planes to generate holograms for each sub-plane; the information in the hologram is distributed over the complete set of pixels. The hologram planes are illuminated, optionally by correspondingly sized beams, to project different sized respective fields on to the display screen. FIG. 5c shows upsizing the input image, the blue image plane in proportion to the ratio of red to blue wavelength (638/445), and the green image plane in proportion to the ratio of red to green wavelengths (638/532) (the red image plane is unchanged). Optionally the upsized image may then be padded with zeros to a number of pixels in the SLM (preferably leaving a little space around the edge to reduce edge effects). The red, green and blue fields have different sizes but are each composed of substantially the same number of pixels, but because the blue, and green images were upsized prior to generating the hologram a given number of pixels in the input image occupies the same spatial extent for red, green and blue colour planes. Here there is the possibility of selecting an image size for the holographic transform procedure which is convenient, for example a multiple of 8 or 16 pixels in each direction.

Super-Resolution ADOSPR

In a 2D holographic video projection system, the output resolution is normally at most the resolution of the microdisplay, because the output image in the replay field is the Fourier transform of the hologram on the microdisplay (a bijective mapping from $Å^{M \times M}$ to $Å^{M \times M}$). Further, when a binary-phase modulator is employed as the microdisplay, with say M×M-pixels, the presence of the conjugate image restricts the addressable output resolution to M×M/2 points. However the inventors have recognised that inter-pixel interference may be exploited to produce increased resolution: Each point in the output is a copy of the Fourier transform of the hologram aperture (if, say, the aperture is square and the illumination uniform this corresponds to a sinc-shaped pixel in the output). The main lobe of such a sinc function is wider than the inter-pixel distance in the output and therefore adjacent pixels will interfere with one another. Ordinarily this is detrimental but it is possible to exploit, the effect to advantage.

The eye perceives not the field amplitude F but its intensity $|F|^2$ and thus manipulation of the phases allows one to influence the pixel values between the sampling grid to create structure at increased spatial frequencies. Super-resolution can be implemented using an ADOSPR-type procedure to generate OSPR hologram sets of resolution M×M that form image reproductions at double (in each dimension) the resolution of that of the hologram, i.e. 2M×2M (2M×M for a binary phase modulator).

We extend the ADOSPR procedure so that, in addition to feeding forward the reproduction error present at each of the M×M sampling points (x, y), the errors present between the sampling points after stage N−1, i.e. at (x½, y), (x, y½) and (x½, y½), are also fed forwards and compensated for when calculating the hologram $H_N$ in stage N. In embodiments this uses a modified inter-pixel Fourier transform operation to evaluate the frequency components every half-sample, instead of every sample. As an alternative to half-sample evaluation, such a transform can be implemented by, for example, padding each M×M hologram up to 2M×2M by embedding it in a matrix of zeros; in either case and we notate this as $F^{2M \times 2M}[H(x, y)]$. Taking the Fourier transform of this padded hologram then produces a 2M×2M field, which can be adjusted for error as desired before taking the inverse Fourier transform to obtain a 2M×2M hologram, which is then band-limited to form the next M×M hologram in the output OSPR set.

Because the hologram is the frequency spectrum of the image, phase holograms (which have uniform amplitude everywhere) form images with a uniform, flat frequency spectrum. For a fixed amplitude target image this implies a requirement of effectively random phase in the image pixels, which would appear to be incompatible with using inter-pixel interference. However an OSPR-with-feedback approach allows phase control to be achieved over a set of subframe holograms each individually having a substantially flat, pseudorandom phase spectrum. In an example super-resolution OSPR-with-feedback procedure the variables are as follows:

N is the number of OSPR subframes to generate.
T is the input video frame of resolution 2M×2M.
The M×M-pixel holograms $H_1 \ldots H_N$ produced at the end of each stage form the output OSPR hologram set.
At each stage of the algorithm, $\phi(x, y)$ is re-initialised to a 2M×2M array of uniformly-distributed random phases. Q iterations of a coherent optimisation sub-algorithm are employed to adjust these phases towards an error minimum.
F(x, y) holds a dynamically-updated 2M×2M-pixel reconstruction of the effect of the hologram subframes calculated so far.
$\gamma$ is the desired display output gamma (2.2 corresponds roughly to a standard CRT).

We next make the following definitions:

The modified (inter-pixel) Fourier transform effectively evaluates a Fourier (or inverse Fourier) transform at intermediate image points i.e.

$$f_{0,0} \to \begin{matrix} F_{0,0} & F_{0.5,0} \\ F_{0,0.5} & F_{0.5,0.5} \end{matrix}, f_{1,0} \to \begin{matrix} F_{1,0} & F_{1.5,0} \\ F_{1,0.5} & F_{1.5,0.5} \end{matrix}, \ldots.$$

Figure 6A:
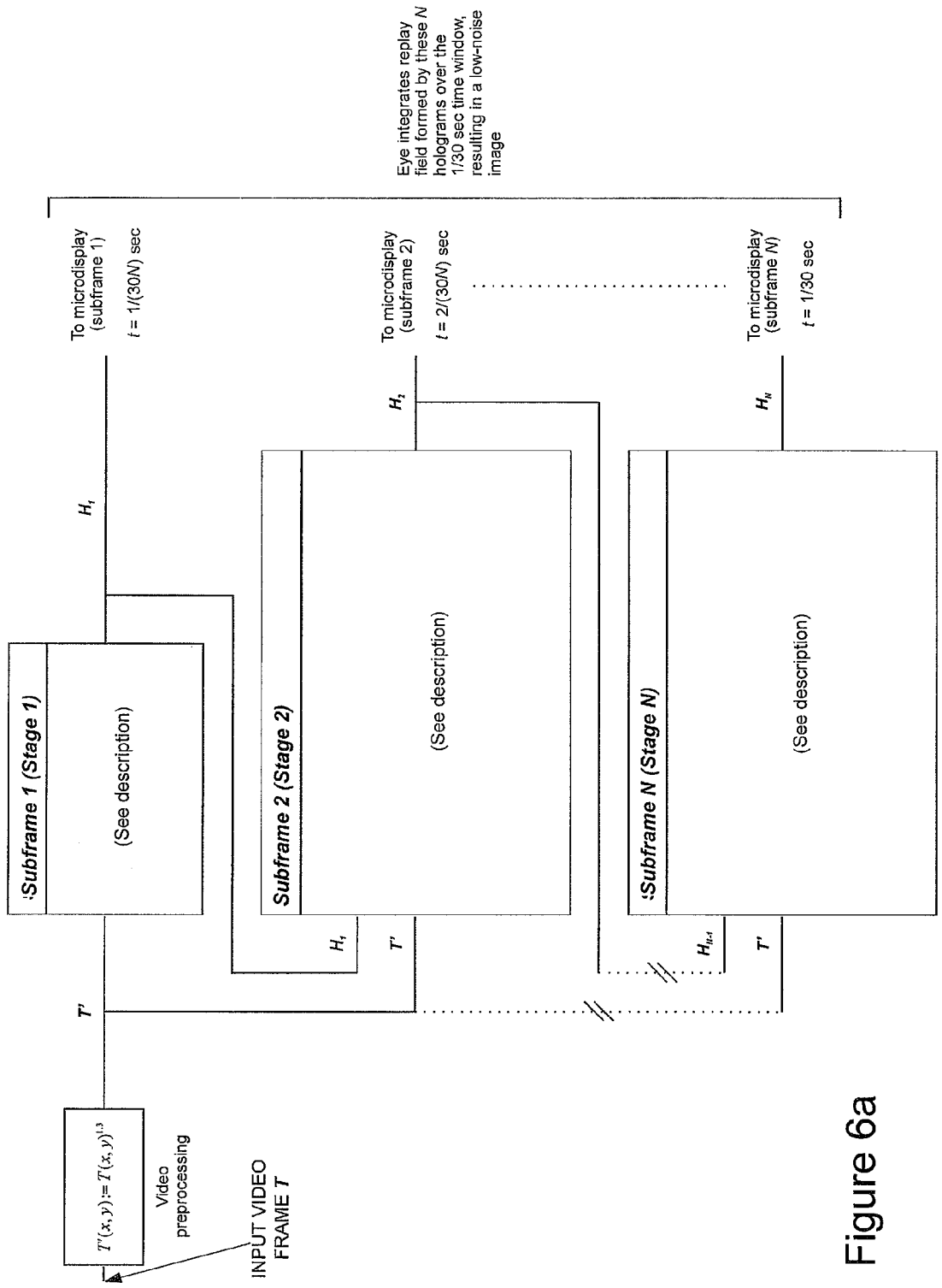
FIGS. 6a and 6b show, respectively, a procedure, and a system for generating N subframe holograms for displaying an enhanced resolution image.

FIG. 6a shows an outline of the procedural steps which are described in detail below.

Preprocessing $T'(x, y) := T(x, y)^{\frac{\gamma}{2}}$ (optional)

Stage 1

$F(x, y) := 0$
$T''(x, y) := T'(x, y) \cdot \exp\{j\phi(x, y)\}$ iterate Q times
$$\begin{bmatrix} H''(x, y) := F^{-1}[T''(x, y)] \\ H'(x, y) := \begin{cases} 1 & \text{if } Re[H''(x, y)] > 0 \\ -1 & \text{otherwise} \end{cases} \\ H_1(x, y) := H'\left(-\frac{M}{2} \leq x < \frac{M}{2}, -\frac{M}{2} \leq y < \frac{M}{2}\right) \\ X(x, y) = F^{2M \times 2M}[H_1(x, y)] \\ T''(x, y) = T'(x, y) \cdot \exp\{jLX(x, y)\} \end{bmatrix}$$

Stage 2

$F(x, y) := F(x, y) + |F^{2M \times 2M}[H_1(x, y)]|^2$ $$\alpha := \frac{\sum_{x,y} T'(x, y)^4}{\sum_{x,y} F(x, y) \cdot T'(x, y)^2}$$

$$T''(x, y) := \begin{cases} \sqrt{2T'(x, y)^2 - \alpha F} \cdot \exp\{j\phi(x, y)\} & \text{if } 2T'(x, y)^2 > \alpha F \\ 0 & \text{otherwise} \end{cases}$$

iterate Q times
$$\begin{bmatrix} H''(x, y) := F^{-1}[T''(x, y)] \\ H'(x, y) := \begin{cases} 1 & \text{if } Re[H''(x, y)] > 0 \\ -1 & \text{otherwise} \end{cases} \\ H_2(x, y) := H'\left(-\frac{M}{2} \leq x < \frac{M}{2}, -\frac{M}{2} \leq y < \frac{M}{2}\right) \\ X(x, y) = F^{2M \times 2M}[H_2(x, y)] \\ T''(x, y) = T'(x, y) \cdot \exp\{jLX(x, y)\} \end{bmatrix}$$

Note that in the above F(x,y) is different to the transform or inverse transform F (which has a superscript).

| Operator | Description | Input X size | Output Y size | Definition |
|---|---|---|---|---|
| F | Fourier transform | 2M × 2M | 2M × 2M | $Y(u, v) = \sum_{x=-M+1}^{M} \sum_{y=-M+1}^{M} e^{-2\pi j\left(\frac{ux+vy}{2M}\right)}$ |
| $F^{-1}$ | Inverse Fourier transform | 2M × 2M | 2M × 2M | $Y(u, v) = \sum_{x=-M+1}^{M} \sum_{y=-M+1}^{M} e^{2\pi j\left(\frac{ux+vy}{2M}\right)}$ |
| $F^{2M \times 2M}$ | Inter-pixel Fourier transform | M × M | 2M × 2M | $Y(u, v) = \sum_{x=-\frac{M}{2}+1}^{\frac{M}{2}} \sum_{y=-\frac{M}{2}+1}^{\frac{M}{2}} e^{-2\pi j\left(\frac{ux+vy}{2M}\right)}$ |

Stage $N$ $$F(x, y) := F(x, y) + |F^{2M \times 2M}[H_{N-1}(x, y)]|^2 \quad \text{update dynamic output estimate}$$

$$\left.\begin{array}{l} \alpha := \dfrac{(N-1)\sum_{x,y} T'(x, y)^4}{\sum_{x,y} F(x, y) \cdot T'(x, y)^2} \\[2ex] T''(x, y) := \begin{cases} \sqrt{N \cdot T'(x, y)^2 - \alpha F} \cdot \exp\{j\phi(x, y)\} & \text{if } N \cdot T'(x, y)^2 > \alpha F \\ 0 & \text{otherwise} \end{cases} \end{array}\right\} \text{calculate } 2M \times 2M \text{ noise compensation target}$$

iterate $Q$ times
$$\left[\begin{array}{l} H''(x, y) := F^{-1}[T''(x, y)] \\ H'(x, y) := \begin{cases} 1 & \text{if } Re[H''(x, y)] > 0 \\ -1 & \text{otherwise} \end{cases} \\ H_N(x, y) := H'\left(-\dfrac{M}{2} \le x < \dfrac{M}{2}, -\dfrac{M}{2} \le y < \dfrac{M}{2}\right) \\ X(x, y) = F^{2M \times 2M}[H_2(x, y)] \\ T'''(x, y) = T'(x, y) \cdot \exp\{j \angle X(x, y)\} \end{array}\right.$$

calculate $M \times M$-bandlimited binary hologram $H_N$ (other approaches may be used)

Figure 6B:
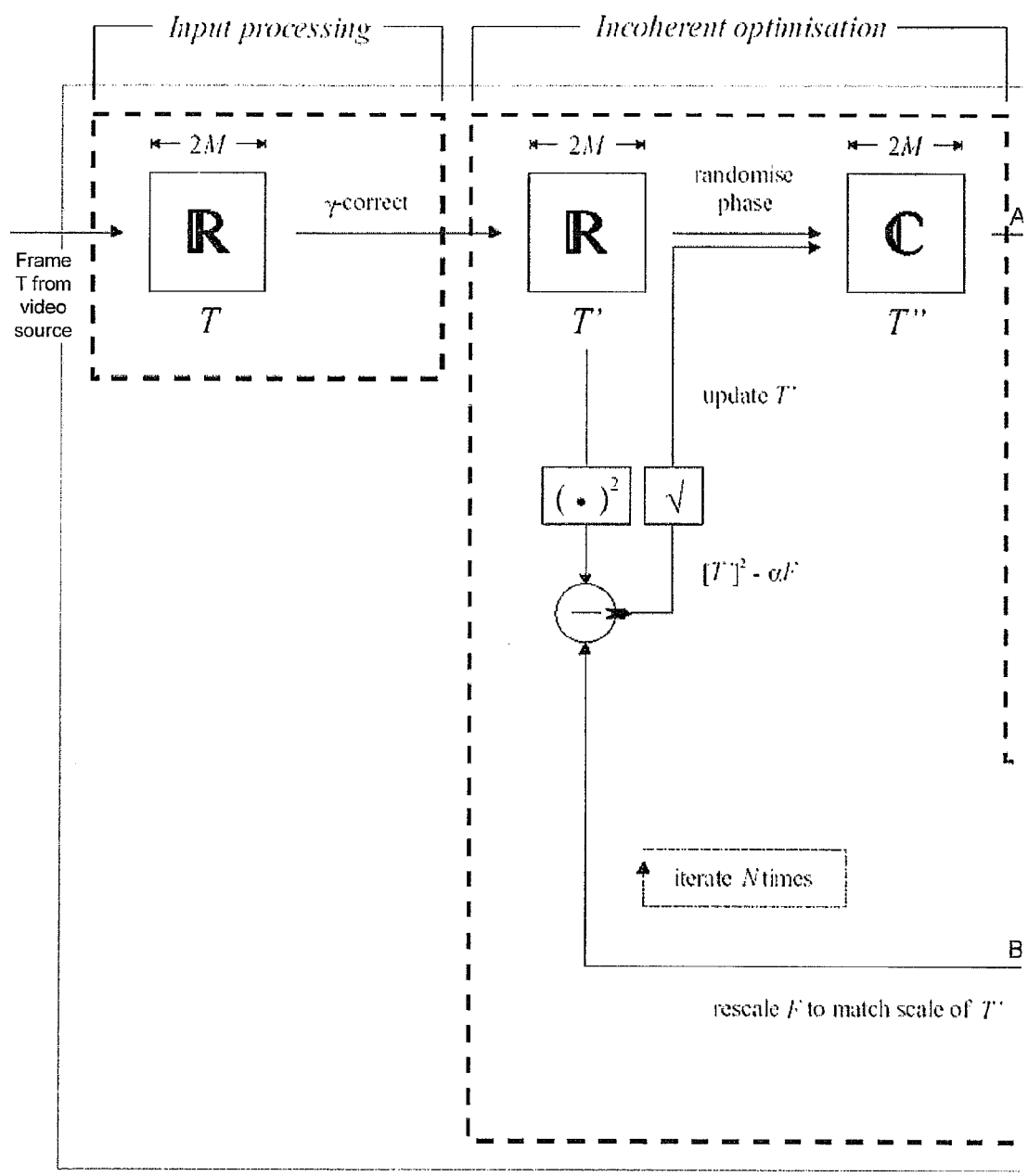
Figure 6B:
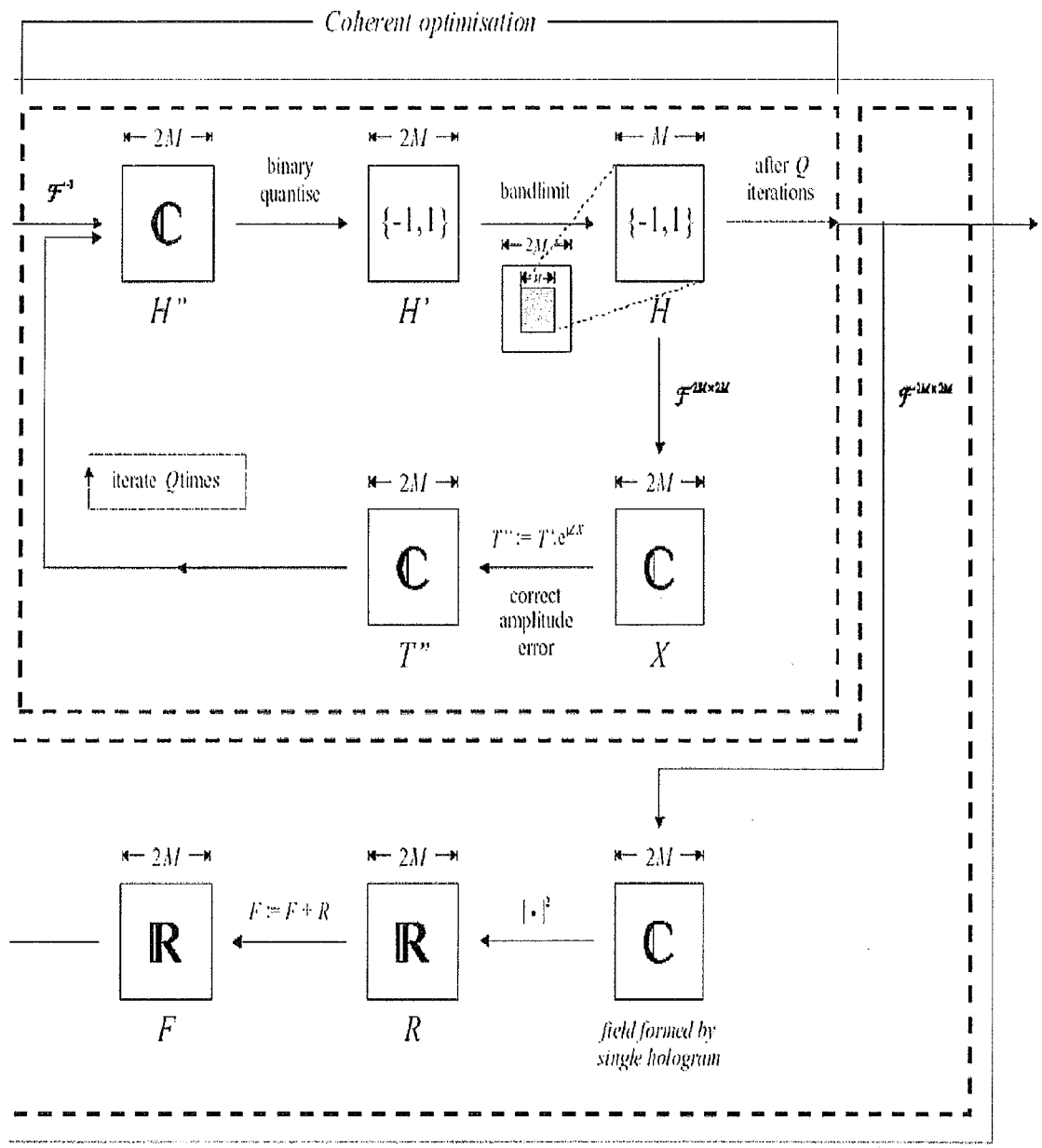

Referring to FIG. 6b, this shows a detailed block diagram of a system for generating a plurality (N) of subframe holograms for displaying a resolution-enhanced image according to the above procedure. In the Figure the operations described above are associated with arrows and the resulting data (typically a two dimensional matrix) by blocks in which $\mathbb{R}$ denotes, $\mathbb{C}$ complex valued data, and $\{-1,1\}$ quantized (here binarised) data. The variables associated with the 2D matrices are shown alongside the blocks, and the dimensions of the matrices are indicated by arrows. In the Figure the blocks (matrices) are square but rectangular image matrices may also be used.

For further details reference may be made to WO 2007/085874, hereby incorporated by reference.

Sub-Segment OSPR

Broadly this involves subdividing the replay field into a plurality of spatially interlaced regions, and displaying holograms for each of the interlaced regions such that interference between adjacent pixels of the replay field is reduced. Thus each interlaced region may comprise a set of pixels of the replay field in which each pixel is surrounded by pixels of substantially zero light intensity, for example regular grids with spaces in between. Holograms for the interlaced regions may be displayed with calculated phase shifts to provide lateral displacements (in pixels) in said replay field of: (0,0), (0,1), (1,0), and (1,1).

A M×M-pixel image T (or a single colour plane for a full-colour system) is divided into multiple interlaced regions, for example by selecting (x,y) coordinate pixels with even-even, even-odd, odd-even, and odd-odd coordinates. The subfield images are termed $T^{00}$, $T^{01}$, $T^{10}$, and $T^{11}$, as follows:

$$T_{yx}^{00} = T_{2y,2x} \quad T_{yx}^{01} = T_{2y,2x+1}$$

$$T_{yx}^{10} = T_{2y+1,2x} \quad T_{yx}^{11} = T_{2y+1,2x+1}$$

$T^{00}$ contains the image pixels with even x and even y coordinates $T^{01}$ contains the image pixels with odd x and even y coordinates $T^{10}$ contains the image pixels with even x and odd y coordinates $T^{11}$ contains the image pixels with odd x and odd y coordinates For each of these sub-segments, the corresponding $$\frac{M}{2} \times \frac{M}{2} - \text{pixel}$$

subfield holograms $H_{00}$, $H_{01}$, $H_{10}$ and $H_{11}$ are then calculated. A variant of our ADOSPR algorithm we term SSOSPR (sub-segment OSPR) may be used to calculate the N sub-frames of the subfield holograms (as described in detail below).

The full (pseudo-replicated) hologram H'$_{00}$, H'$_{01}$, H'$_{10}$ and H'$_{11}$ of each interlaced region is formed by displaying a plurality of substantial replicas of said subfield hologram simultaneously on said SLM. H'$_{00}$, H'$_{01}$, H'$_{10}$ and H'$_{11}$ are defined as follows:

$$H'_{00} = \begin{pmatrix} H_{00} & H_{00} \\ H_{00} & H_{00} \end{pmatrix}$$

$$H'_{01} = \begin{pmatrix} H_{10} & -H_{10} \\ H_{10} & -H_{10} \end{pmatrix}$$

$$H'_{10} = \begin{pmatrix} H_{01} & H_{01} \\ -H_{01} & -H_{01} \end{pmatrix}$$

$$H'_{11} = \begin{pmatrix} H_{11} & -H_{11} \\ -H_{11} & H_{11} \end{pmatrix}$$

H'$_{00}$ comprises four replicas of the subfield hologram H$_{00}$ one in each quadrant (or tile) of the hologram. Displaying H'$_{00}$ on the display will render just the image pixels with even x and even y coordinates in the correct locations, with zeroes elsewhere in the reproduction. Similarly, H'$_{01}$ comprises four replicas of the subfield hologram H$_{01}$ one in each quadrant of the hologram with the data inverted for the right-hand quadrants. H'$_{01}$ will render just the image pixels with odd x and even y coordinates, with zeroes elsewhere, and so forth. As a result, if we time-sequence the holograms H'$_{00}$, H'$_{01}$, H'$_{10}$, H'$_{11}$, the entire image is formed through incoherent summation (in the eye) of the four interlaced regions.

Before processing each subfield image, four complex phase shift matrices, along with their complex conjugates, are computed. These provide lateral displacements of (0,0), (0,1), (1,0), and (1,1) pixels in the replay field. The matrices are fixed and can in principle be pre-stored, or their elements generated on-the-fly as data passes through the FFT engine.

These phase shift matrices are of size $$\frac{M}{2} \times \frac{M}{2}$$

and have elements given below.

$$P_{vu}^{00} = 1 \quad P_{vu}^{01} = e^{\frac{2\pi j u}{M}} \quad \overline{P}_{vu}^{00} = 1 \quad \overline{P}_{vu}^{01} = e^{\frac{-2\pi j u}{M}}$$

$$P_{vu}^{10} = e^{\frac{2\pi j v}{M}} \quad P_{vu}^{11} = e^{\frac{2\pi j(u+v)}{M}} \quad \overline{P}_{vu}^{10} = e^{\frac{-2\pi j v}{M}} \quad \overline{P}_{vu}^{11} = e^{\frac{-2\pi j(u+v)}{M}}$$

where $$0 \le v, u < \frac{M}{2},$$

with v representing the vertical coordinate in hologram space, and u representing the horizontal coordinate.

Each of the target segments $T^{qp}$ may be processed independently, in parallel or (probably preferably) sequentially. We define terms as follows:

The loop variable i represents the current sub-frame number $T_{yx}^{qp}$ represents the amplitude of the input image for sub-segment qp, at coordinates (x, y)

$T_{yx}^{(1,qp)}$ represents the target image energy of sub-frame i, sub-segment qp $E_{yx}^{qp}$ represents the constantly-updated estimate of the reconstruction field intensity error $\hat{T}_{yx}^{(i,qp)}$ represents the desired target image field, adjusted for the intensity error E present $H_{vu}^{(i,qp)}$ and $\hat{H}_{vu}^{(i,qp)}$ represent non-quantised and quantised holograms respectively, generated by the algorithm $P^{qp}$ represent the phase-shift matrices described above, with $\overline{P}^{qp}$ representing their complex conjugates The loop variable q represents the iteration number of the coherent optimisation loop (Liu-Taghizadeh)

$\psi_{yx}^{(i,qp)}$ represents the fully-complex reconstruction field $\psi'_{yx}^{(i,qp)}$ represents an error-reducing modification to the reconstruction field $\psi_{xy}^{(i,qp)}$ $I_{yx}^{(i,qp)}$ represents the instantaneous intensity of the reconstruction field, as perceived by the eye α and κ represent Fourier transform scaling constants $\gamma_1$ and $\gamma_2$ represent fixed algorithm constants, with final values to be determined (currently $\gamma_1=2$ and $\gamma_2=1$)

The algorithm that follows is executed in its entirety for each segment qp, where qp is 00, 01, 10 or 11: The first step of initialising algorithm variables sets:

$$i := 1$$

$$T_{yx}^{(1,qp)} := [T_{yx}^{qp}]^2 \quad 0 \le y, x < \frac{M}{2}$$

$$E_{yx}^{qp} := 0$$

The field error estimate E is initially set to zero and refined in later iterations.

The target field, adjusted for field error E, is calculated as:

$$\hat{T}_{yx}^{(i,qp)} := \begin{cases} \sqrt{T_{yx}^{(i,qp)} - E_{yx}^{qp}} & \text{if } T_{yx}^{(i,qp)} > E_{yx}^{qp} \\ 0 & \text{otherwise} \end{cases}$$

A first approximation to the hologram is generated by phase modulating the target field, i.e. multiplying by $e^{j\Theta}$, then transforming, i.e. by applying an inverse Fourier transform and multiplying pointwise with the appropriate phase-shift matrix P. The steps of phase modulating and transforming are as used in the OSPR procedure described above. The variation is the introduction of multiplication by phase-shift matrix P.

$$H_{vu}^{(i,qp)} := P_{vu}^{qp} \cdot F^{-1}[\hat{T}_{yx}^{(i,qp)} \cdot e^{j\phi_{yx}^{(i)}}]$$

As in the OSPR procedure described above, the fully complex hologram may then optionally quantised to binary phase, as follows:

$$\hat{H}_{vu}^{(i,qp)} := \begin{cases} -1 & Re(H_{vu}^{(i,qp)}) \le 0 \\ 1 & Re(H_{vu}^{(i,qp)}) > 0 \end{cases}$$

Although binary phase quantisation is described, multi-phase quantisation is an alternative approach. The first approximation may be refined, e.g. by applying the four steps of the Liu-Taghizadeh algorithm or another similar sub-algorithm.

Step 1 of the Liu-Taghizadeh algorithm is to calculate the FFT of the ith hologram, e.g. by applying the following equations for the binarised hologram:

$$q := 0$$

$$\psi_{yx}^{(i,qp)} := F[\overline{P}_{vu}^{qp} \cdot \hat{H}_{vu}^{(i,qp)}]$$

Step 2 is to update the obtained field with coherent noise compensation in the specified signal window W. Constants are $\gamma_1=2, \gamma_2=1$ (subject to change)

$$\kappa := \frac{\sum_{x,y \in W} |\psi_{yx}^{(i,qp)}|}{\sum_{x,y \in W} \sqrt{\hat{T}_{yx}^{(i,qp)}}}$$

$$\psi'_{yx}^{(i,qp)} := \begin{cases} \left| \gamma_1 \kappa \sqrt{\hat{T}_{yx}^{(i,qp)}} - \gamma_2 \psi_{yx}^{(i,qp)} \right| \cdot e^{j\angle \psi_{yx}^{(i,qp)}} & (x,y) \in W \\ \text{unchanged} & (x,y) \notin W \end{cases}$$

Step 3 is to calculate a first iteration of an improved hologram which may then be optionally binarised:

$$H_{vu}^{(i,qp)} := P_{vu}^{qp} \cdot F^{-1}[\psi'_{yx}^{(i,qp)}]$$

$$\hat{H}_{vu}^{(i,qp)} := \begin{cases} -1 & Re(H_{vu}^{(i,qp)}) \le 0 \\ 1 & Re(H_{vu}^{(i,qp)}) > 0 \end{cases}$$

Step 4 is to complete the next loop of the Liu-Taghizadeh sub-algorithm, feeding each iteration of the improved hologram through, until done Q iterations have been completed, i.e.

$$q = q+1$$

Go to step 1 of the Liu-Taghizadeh algorithm if q<Q

The hologram generated by the final iteration of the Liu-Taghizadeh sub-algorithm is then sent to the display. The Liu-Taghizadeh sub-algorithm is a standard sub-algorithm that may be replaced with equivalent sub-algorithms; it is not essential that such a sub-algorithm is used. The Liu-Taghizadeh sub-algorithm may be altered to generate an improved hologram when the binarisation step is omitted.

Once the Liu-Taghizadeh sub-algorithm is completed, the intensity of the hologram is multiplied by the complex conjugate of the phase-shift matrix and its Fast Fourier transform is calculated. In other words, the transform and phase-shift steps detailed above are reversed.

$$I_{yx}^{(i,qp)} := |F[\tilde{P}_{vu}^{qp} \cdot \tilde{H}_{vu}^{(i,qp)}]|^2$$

The equation above shows a binarised hologram but the equation may be amended to calculate the intensity for a hologram which has not been binarised.

The intensity error estimate is calculated to compensate for the noise perceived by the eye at this point as follows:

$$\alpha := \sqrt{\frac{\sum_{x,y} T_{yx}^{(i,qp)} I_{yx}^{(i,qp)}}{\sum_{x,y} [I_{yx}^{(i,qp)}]^2}}$$

$$E_{yx}^{qp} := E_{yx}^{qp} + \alpha I_{yx}^{(i,qp)} - T_{yx}^{(i,qp)}$$

The calculated intensity error is fed into the second step, namely calculate the target field and all the subsequent steps of the algorithm are re-calculated. The algorithm loops until all N holograms have been produced.

The algorithm is run for each of the 4 sub-segments, generating a total of 4N hologram sub-frames, given by $H_{vu}^{(i,qp)}$. These holograms are then processed (preferably internally in the display) to form the pseudo-replicated holograms $H'_{vu}^{(i,qp)}$ defined above, which are then displayed.

Because the subfield holograms are independent, they can be computed sequentially. As each subfield hologram requires a Fourier transform of size of only $$\frac{M}{2} \times \frac{M}{2},$$

instead of M×M, the memory size required for the transform step is reduced by a factor of four. The above procedure is relatively computationally complex, but because the techniques we describe later employ only a relatively low resolution hologram SLM this need not be a problem. However for video the concepts of i-frames and s-frames may be employed (an initial frame represents a new incoming video frame for which holograms are generated from scratch; a subsequent frame uses the hologram generated for the previous video frame as an initial estimate).

For further details reference may be made to GB 0724161.5 filed 11 Dec. 2007, hereby incorporated by reference.

Dual Modulation Architecture

We now describe an improved architecture which employs dual SLM modulation—low resolution phase modulation and higher resolution amplitude (intensity) modulation. This can provide substantial improvements over the approaches we have previously described, in particular improvements in one or more of: image quality, resolution, contrast, brightness, power consumption and physical size.

Most of the energy of a typical video image is concentrated in the low spatial frequencies. This is illustrated in FIG. 1 which shows an example image (left) and the corresponding power spectrum (right).

Since the primary gain of holographic projection over imaging is one of energy efficiency, one can reason that it is only the low spatial frequencies of an image that need to be rendered holographically to maintain high efficiency. Because the resolution of a hologram determines the maximum spatial frequency that can be represented in the corresponding image, it follows that only a very low-resolution hologram is required to accurately render the low spatial frequencies of a video image, which represent most of its energy. The high-frequency components can then be rendered with an intensity-modulating imaging panel, placed in a plane conjugate to the hologram SLM. Effectively, diffracted light from the hologram SLM device (SLM1) is used to illuminate the imaging SLM device (SLM2). Because the high-frequency components contain relatively little energy, the light blocked by the imaging SLM does not significantly decrease the efficiency of the system, unlike in a conventional imaging system.

The hologram SLM should preferably be a fast multi-phase device, for high diffraction efficiency. Successful results have been obtained in simulation with the imaging SLM being either a fast binary device (FLC) or a slow analogue device (nematic). Such an approach has a number of attractive features as we have previously mentioned. These include significantly lower power consumption due to reduced computation; a system which is scalable with resolution: no new ASIC or hologram SLM required when it is desired to increase projector resolution; the ability to use existing high-resolution FLC (Ferroelectric Liquid Crystal)/nematic panels or even a DLP (digital light processor for the imaging SLM; an increased ANSI contrast (potentially greater than 1000:1, 1500:1 or 2000:1—an order of magnitude high than achievable with an imaging SLM alone); and a significant size reduction as the laser beams now illuminate a significantly smaller hologram SLM, substantially shrinking down the illumination optics. Embodiments of the system also have relatively slow PWM (Pulse Width Modulation) laser modulation (e.g. 1-2 kHz). Apart, in embodiments for a very small motion of a diffuser, no moving parts used to form an image, so they system can be robust to shock and vibration; 8 bit intensity resolution is possible.

Figure 2:
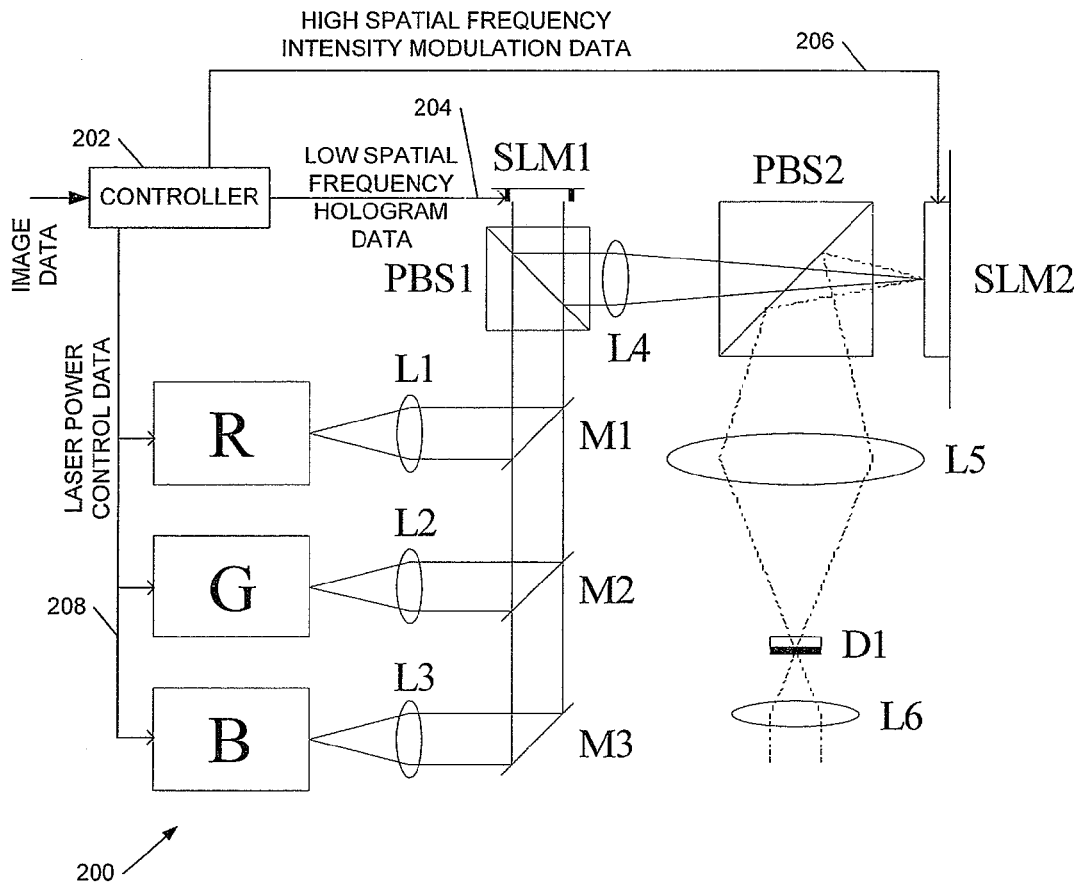
FIG. 2 shows an embodiment of a holographic image projection system according to the invention.

FIG. 2 shows a reference optical layout for a holographic image projection system 200 an embodiment of the invention. In the full colour holographic image projector of FIG. 2 there are red R, green G, and blue B lasers. The system also includes the following additional elements:

SLM1 is the hologram SLM (spatial light modulator), potential size 32×32 or 64×64 pixels, of pixel pitch Δ.

L1, L2 and L3 are collimation lenses for the R, G and B lasers respectively. For a 64×64 pixel hologram SLM with 5.62 µm pixels, the SLM active area is around 0.36 mm×0.36 mm, so it should be possible to employ a very slow illuminator design.

M1, M2 and M3 are the corresponding dichroic mirrors. Again, these need be only slightly larger than the laser beam waist (0.36 mm).

PBS1 (Polarising Beam Splitter 1) transmits the incident illumination to SLM1. Diffracted light produced by SLM1—naturally rotated (with a liquid crystal SLM) in polarisation by 90 degrees—is then reflected by PBS1 towards L4. PBS1 needs to have a clear aperture at least as large as the active area of SLM1.

SLM2 is the imaging SLM, of size equal to the target image resolution (e.g. 854×480).

Lens L4 forms an intermediate image plane on the surface of SLM2. Its focal length f is set so that $f\lambda/\Delta$ is equal to the size of the active area of the imaging SLM. That is the intermediate real image from the hologram(s) on SLM1 fits on/covers the active area of SLM2 which modulates this image. In embodiments L4 may be encoded into the hologram(s) on SLM1, for example using the techniques we have described in WO2007/110668.

PBS2 (Polarising Beam Splitter 2) transmits incident light to SLM2, and reflects emergent light into the path of the output optics. PBS2 should have a clear aperture at least as large as the active area of SLM2.

Lenses L5 and L6 form an output telescope (demagnifying optics), as with holographic projectors we have previously described. The output projection angle is proportional to the ratio of the focal length of L5 to that of L6.

D1 is a piezoelectrically-actuated diffuser to reduce speckle, as we have described, for example in GB0800167.9.

A system controller 202 performs signal processing in either dedicated hardware, or in software, or in a combination of the two, as described further below. Thus controller 202 inputs image data and provides low spatial frequency hologram data 204 to SLM1 and higher spatial frequency intensity modulation data 206 to SLM2. The controller also provides laser light intensity control data 208 to each of the three lasers.

In embodiments SLM1 may be a reflective charge-driven 90° ferroelectric liquid crystal SLM from DisplayTech® with a quarter wave plate between the pixel mirror layer and the liquid crystal material. Alternatively a Mirasol® SLM from Qualcomm Inc may be used.

Example Procedure

We now describe an example procedure to implement embodiments of the invention. This example procedure is based on super-resolution ADOSPR but approaches based, for example, on ADOSPR and on sub-segment ADOSPR may also be employed. In general the techniques are not limited to use with an OSPR-type hologram generation procedure, although this is computationally efficient. The procedure assumes a fast phase-modulating (binary or multi-phase) hologram SLM, and a (slower) nematic imaging SLM, although the skilled person will appreciate that other imaging technologies may be equally appropriate.

In all cases the illumination incident on the SLM is assumed to be Gaussian, with the $1/e^2$ intensity at the edges of the SLM.

Variables
1. The hologram SLM size is M×M pixels.
2. The input image target amplitude, T, is of size P×P pixels. Amplitude range for the input is between 0 (black) and 1 (white).
3. N ADOSPR subframes are to be generated.
4. D is a diffraction efficiency boost parameter controlling the trade-off between reconstruction error and diffraction efficiency A value of 1.0 gives theoretically perfect reconstruction; larger values of D increase the optical efficiency at the expense of increasing the noise. Based on the appearance of simulated images a practical maximum for D appears to be less than 2, for example approximately 1.5 (see below).

Procedure Flow
1. Form a 2M×2M target image, R, for hologram generation comprising peak values of blocks of the image. Subdivide the input (P×P) image T into 2M×2M blocks, each of size P/2M×P/2M. Set each pixel of the target R to be the peak amplitude of the image data within the corresponding P/2M×P/2M block of the image.
2. Generate a hologram set H of N holograms of size M×M from R. In this example, the above-described super-resolution ADOSPR algorithm is employed, optionally iteratively optimising the holograms, for example using a Gerchberg-Saxton procedure.
3. Calculate the reconstruction intensity I of the hologram set, oversampled to P×P pixels. Sum the intensities of the reconstructions of each of the N holograms and divide the final intensity by N. (An example of reconstruction of an image from hologram data is described above, as part of the ADOSPR procedure).
4. Calculate the intensity image F to display on the imaging SLM. Set each pixel of F to the corresponding pixel of the target image intensity $T^2$. Divide each pixel in F by the corresponding pixel intensity in I. Let m be the maximum value in the new field F. Then multiply each pixel in F by D/m. Finally, set every pixel greater than 1 in F to 1.
5. The relative laser power K used to display this frame is given by m/D.

The image can now be projected by displaying F on the imaging SLM, while sequentially displaying the N hologram subframes on the hologram SLM. For a 30 Hz full-colour video input an N=16 holograms per colour plane, rates of 1.44 kHz and 90 Hz are required on the hologram and imaging SLM respectively. For the avoidance of colour break-up, it can be preferable to increase, for example double these rates (2.88 kHz/180 Hz), with frames being duplicated as desired.

Figure 7A:
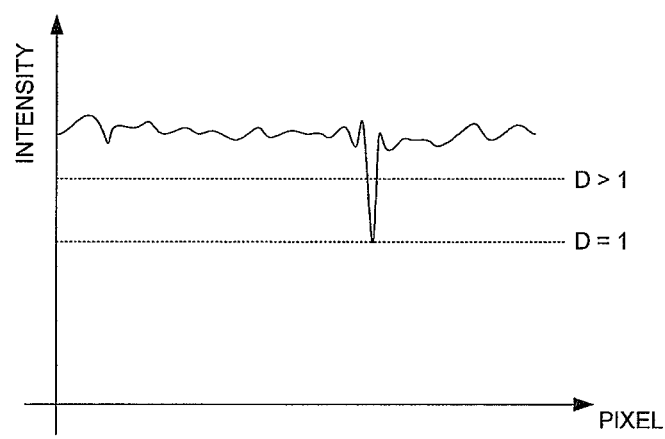
FIGS. 7a to 7c show, respectively a schematic illustration of the effect of a diffraction efficiency boost parameter, a software implementation of an embodiment of a dual spatial frequency phase, intensity holographic projection system controller according to an embodiment of the invention, and a hardware implementation of an embodiment of a dual spatial frequency phase, intensity holographic projection system controller according to an embodiment of the invention.

FIG. 7a shows, schematically, the effect of the diffraction efficiency boost parameter, D.

Figure 7B:
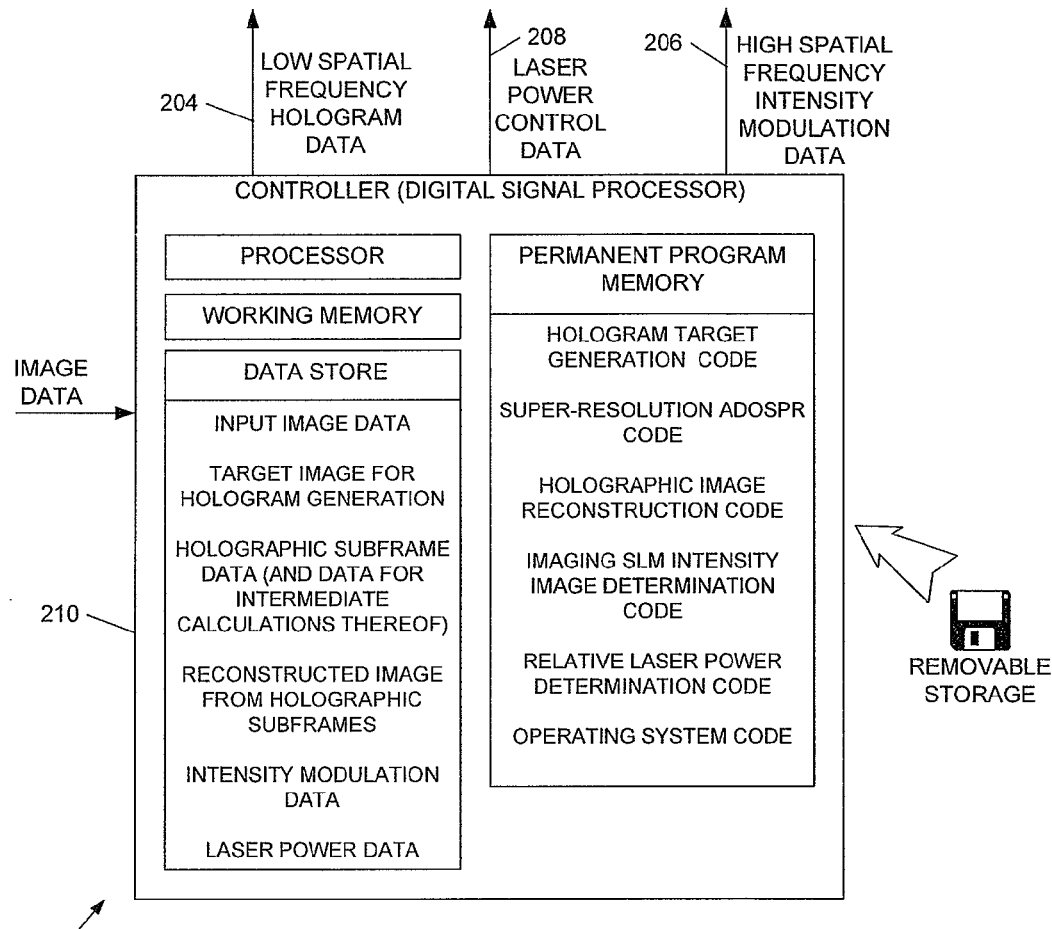
Figure 7C:
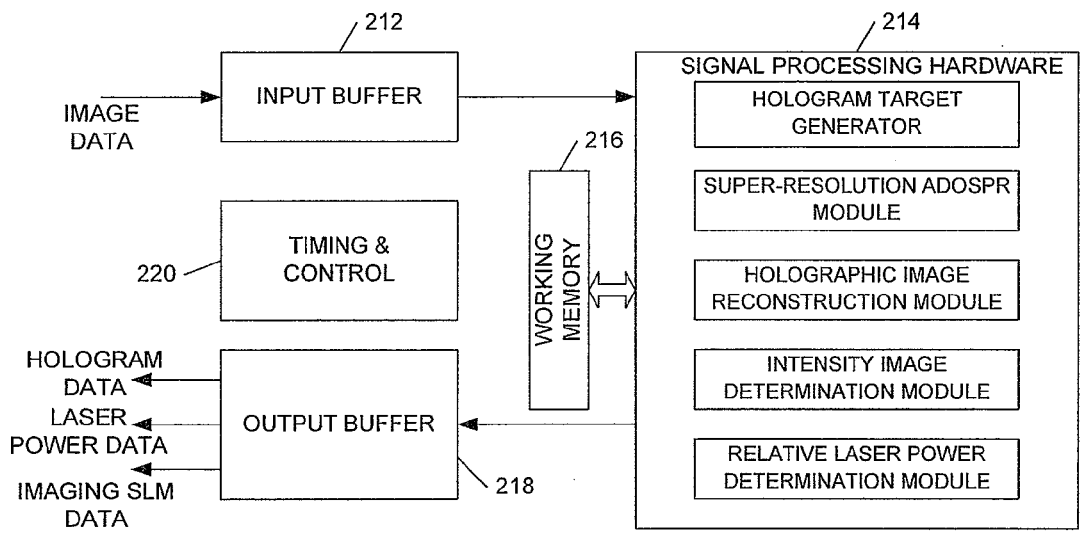

FIG. 7b shows a first example implementation of a holographic projection system controller 202, including a digital signal processor 210 operating under control of processor control code (which may be provided on a storage medium such as Flash memory) to implement a procedure as described above. FIG. 7c shows an alternative implementation of an embodiment of the holographic projection system controller 202, in dedicated hardware. In FIG. 7c the image data is provided to an input buffer 212 and thence to a hardware processing module 214 which comprises hardware to implement: a hologram target generator, a super-resolution ADOSPR module (as described above), a holographic image reconstruction module, an intensity image determination module to determine data to display on the imaging SLM, and preferably a relative laser power determination module. The hardware processing module is coupled to working memory 216 and provides output data to an output buffer 218, which provides data outputs to drive the SLMs and to control the laser powers. The input and output buffers, hardware processing module and working memory operate under control of a timing and control block 220.

Simulated Results

The procedure described above was used to form hologram/image pairs for a Mustang image, size 640×640 pixels (see FIG. 1, left) and the simulated reconstructions were calculated. First-order diffraction efficiency, RMS reconstruction error, and peak reconstruction error were measured.

Diffraction efficiencies are given relative to a theoretical continuous-phase holographic projection architecture of the type shown in FIG. 5a.

Example SLM1 replay field (incident on SLM2 surface) and SLM2 data 8 phase levels
M=32×32-pixel SLM
N=16 subframes
D=1

Figure 8:
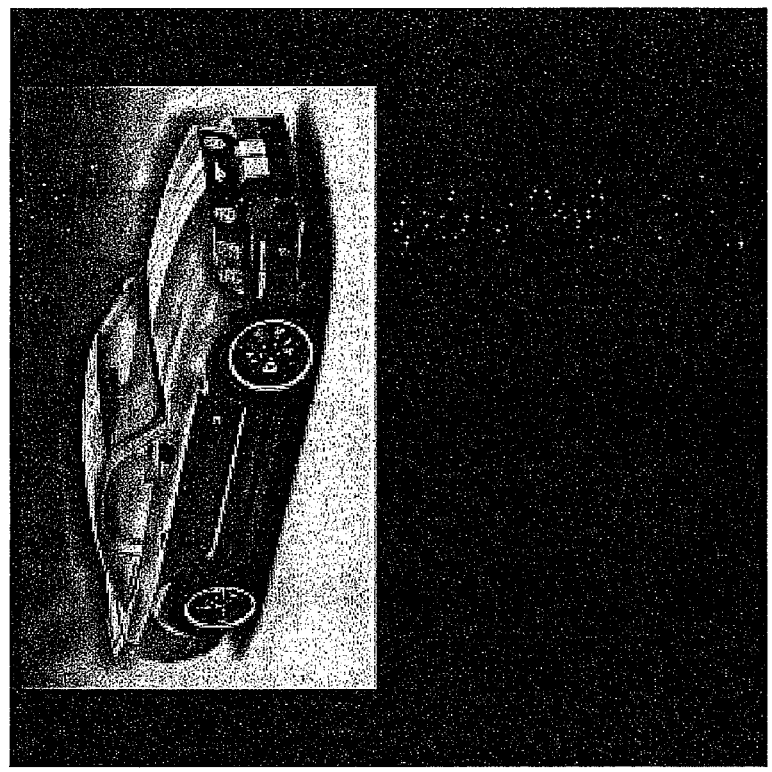
FIG. 8 shows (left) a replay field I formed by 16 hologram subframes displayed on a phase SLM and (right) the corresponding high-frequency image to display on an intensity modulating SLM2 to modulate the field I to reproduce the Mustang image of FIG. 1.
Figure 8:
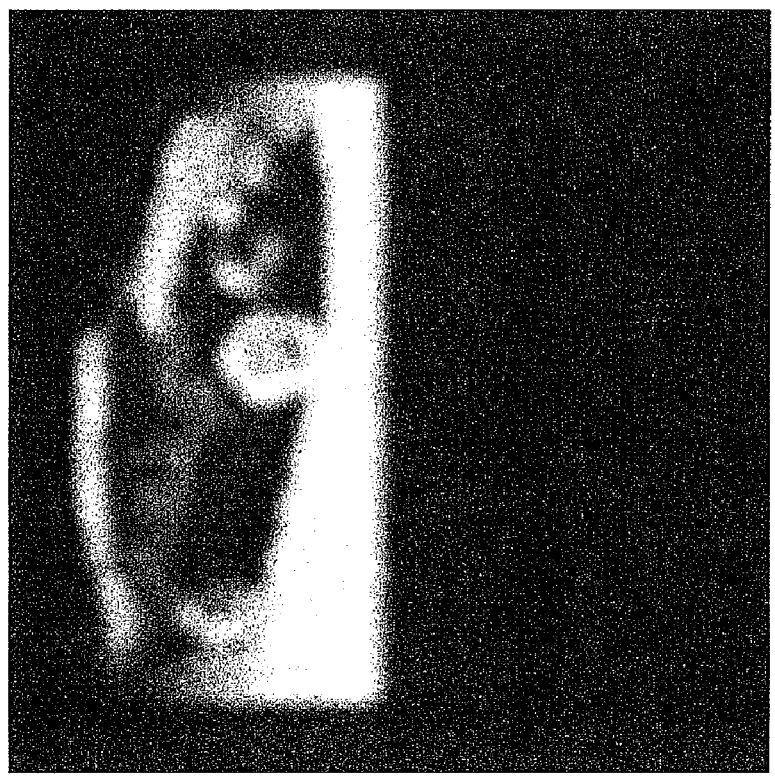
Figure 9A:
FIGS. 9a to 9f show examples of the Mustang image for respective diffraction efficiency boost parameter values, D, of D=1.0, 1.3, 1.5, 2.0, 4.0, and 8.0.
Figure 9B:
Figure 9C:
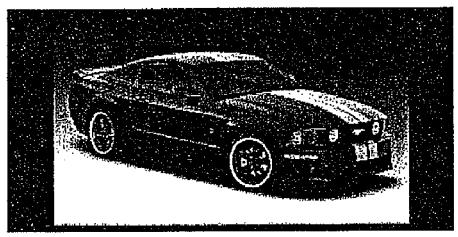
Figure 9D:
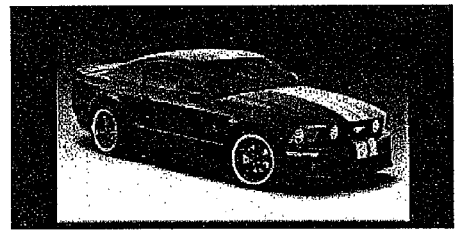
Figure 9E:
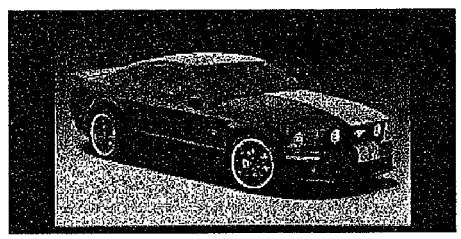
Figure 9F:
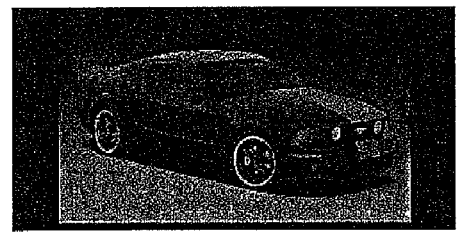

FIG. 8 shows, on the left, a replay field I formed by 16 hologram subframes displayed on a phase SLM—an ~32×32 pixel SLM; the replay field is the Fourier transform of SLM1. FIG. 8, right, shows the corresponding high-frequency image to display on intensity modulating SLM2. The product of the intensities of I and F gives the original Mustang image intensity (FIG. 1) with zero reconstruction error, and a diffraction efficiency of 0.333.

Effect of SLM phase levels on performance
M=32×32-pixel SLM
N=16 subframes
D=1

| SLM phase levels | Diffraction efficiency | RMS reconstruction error | Peak reconstruction error |
| --- | --- | --- | --- |
| 2 | 0.161 | 0 | 0 |
| 3 | 0.263 | 0 | 0 |
| 4 | 0.268 | 0 | 0 |
| 8 | 0.333 | 0 | 0 |
| 16 | 0.294 | 0 | 0 |
| 32 | 0.290 | 0 | 0 |
| Continuous | 0.289 | 0 | 0 |

Effect of SLM resolution on performance
8 phase levels
N=16 subframes
D=1

| SLM size M | Diffraction efficiency | RMS reconstruction error | Peak reconstruction error |
| --- | --- | --- | --- |
| 16 × 16 | 0.259 | 0 | 0 |
| 32 × 32 | 0.333 | 0 | 0 |
| 40 × 40 | 0.342 | 0 | 0 |
| 64 × 64 | 0.290 | 0 | 0 |
| 80 × 80 | 0.310 | 0 | 0 |
| 160 × 160 | 0.280 | 0 | 0 |

Effect of D on performance
8 phase levels
N=16 subframes
M=32×32-pixel SLM

| DE boost factor D | Diffraction efficiency | RMS reconstruction error | Peak reconstruction error |
| --- | --- | --- | --- |
| 1.0 | 0.333 | 0 | 0 |
| 1.2 | 0.400 | 0.0009 | 0.087 |
| 1.4 | 0.465 | 0.0048 | 0.155 |
| 1.6 | 0.526 | 0.0105 | 0.209 |
| 1.8 | 0.558 | 0.0224 | 0.255 |
| 2.0 | 0.569 | 0.0391 | 0.293 |
| 3.0 | 0.599 | 0.1054 | 0.423 |
| 5.0 | 0.633 | 0.1759 | 0.553 |

Effect of subframe count N on performance (D=1)
8 phase levels
M=32×32-pixel SLM
D=1

| Subframe count N | Diffraction efficiency | RMS reconstruction error | Peak reconstruction error |
| --- | --- | --- | --- |
| 2 | 0.029 | 0 | 0 |
| 4 | 0.214 | 0 | 0 |
| 8 | 0.269 | 0 | 0 |
| 16 | 0.333 | 0 | 0 |
| 32 | 0.335 | 0 | 0 |

Effect of subframe count N on performance (D=1.6)
8 phase levels
M=32×32-pixel SLM
D=1.6

| Subframe count N | Diffraction efficiency | RMS reconstruction error | Peak reconstruction error |
| --- | --- | --- | --- |
| 2 | 0.046 | 0.0001 | 0.033 |
| 4 | 0.342 | 0.0032 | 0.166 |
| 8 | 0.429 | 0.0053 | 0.209 |
| 16 | 0.526 | 0.0105 | 0.209 |
| 32 | 0.528 | 0.0091 | 0.159 |

The visual effect on image quality of varying D
8 phase levels
N=16 subframes
M=32×32-pixel SLM The visual effect is shown in FIGS. 9a to 9f, for D=1.0, 1.3, 1.5, 2.0, 4.0, and 8.0 respectively. It can be seen that the image quality deteriorates at D=2, whereas D=1.5 produces a high quality image with good diffraction efficiency. The tables above suggest that, depending on the application, a value of diffraction efficiency scaling parameter value D in the range D=1.4 to 1.8, for example D=1.5 to 1.6 may represent a good image quality-diffraction efficiency balance.

Applications for the above described systems include, but are not limited to, the following: control room displays; data projection; mobile phones; PDAs; laptops; digital cameras; digital video cameras; games consoles; in-car cinema; navigation systems (in-car or personal e.g. wristwatch GPS); head-up and helmet-mounted displays for automobiles and aviation; watches; personal media players (for example an MP3 player or personal video player); dashboard mounted displays; laser light show boxes; personal video projectors (a "video iPod®" concept); advertising and signage systems; computers (including desktops); remote control units; architectural fixtures incorporating a holographic image display system; and, more generally, any device where it is desirable to share pictures and/or for more than one person at once to view an image.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of displaying an image holographically, the method comprising:
inputting display image data defining said image for display;
processing said image data to determine first image data representing a first spatial frequency portion of said image data and second image data representing a second spatial frequency portion of said image data, wherein said second spatial frequency is higher than said first spatial frequency;
displaying a hologram of said first image data on a spatial light modulator (SLM) to form a holographically generated intermediate real image;
modulating said intermediate real image using said second image data to display said image;
wherein said displaying of said hologram comprises phase modulating light from a laser light source using said spatial light modulator, and wherein said modulating of said intermediate real image comprises intensity modulating said intermediate real image using a second spatial light modulator.

2. A method of displaying an image holographically as claimed in claim 1 wherein said modulating comprises determining, from said second image data modulation data for driving said second spatial light modulator, and wherein said determining of said modulation data comprises scaling said second image data to increase pixel values of said second image data.

3. A method of displaying an image holographically as claimed in claim 2 further comprising controlling an intensity of said light from said laser light source to compensate for said scaling.

4. A method of displaying an image holographically as claimed in claim 1 further comprising projecting light from said modulated intermediate real image, said projecting including forming a second intermediate real image onto a diffuser.

5. A method of displaying an image holographically as claimed in claim 1 wherein said displaying of said hologram of said first image data comprises generating and displaying a plurality of temporal holographic subframes, wherein each of said subframes after a first said subframe includes noise at least partially compensating for noise in one or more previous said subframes.

6. A method of displaying an image holographically as claimed in claim 1 wherein said image comprises a full colour image.

7. A holographic image projection system comprising:
at least one laser light source;
a first spatial light modulator (SLM) to phase modulate light from said at least one laser light source;
intermediate optics to provide an intermediate real image plane at which a real image produced by a hologram on said first SLM is formed;
a second SLM located at said intermediate real image plane to intensity modulate said real image; and
output optics to project an image of said intensity modulated real image; and
wherein a resolution of said second SLM is greater than a resolution of said first SLM.

8. A holographic image projection system as claimed in claim 7 wherein one or both of said first and second SLM comprises a reflective SLM, wherein one or both of said first and second SLM has an associated beam splitter, and wherein an optical path from said laser light source to said output optics comprises a folded optical path.

9. A holographic image projection system as claimed in claim 7 wherein said output optics are configured to provide a second intermediate real image plane, and wherein said output optics include a diffuser in said second intermediate real image plane.

10. A holographic image projection system as claimed in claim 9 wherein said diffuser is a piezoelectrically actuated diffuser.

11. A holographic image projection system as claimed in claim 7 wherein an active area of said first SLM is smaller than an active area of said second SLM.

12. A holographic image projection system as claimed in claim 11 wherein said active area of said first SLM has a maximum lateral dimension of less than 1 mm or of less than 0.5 mm.

13. A holographic image projection system as claimed in claim 7 wherein said first SLM comprises a multiphase SLM with at least three quantised phase levels.

14. A holographic image projection system as claimed in claim 7 comprising three said laser light sources of different wavelengths, and including optics such that each said three wavelengths is provided along a common optical path to said first SLM, whereby said holographic image projection system is able to provide a full colour display.

15. A holographic image projection system as claimed in claim 7 further comprising a controller to input image data defining an image for display and to control said first SLM to display a hologram to form said real image at said intermediate image plane with a first spatial resolution and to control said second SLM to intensity modulate said real image at a second higher spatial resolution to reproduce said image for display.

* * * * *

UNITED STATES PATENT AND TRADEMARK OFFICE
CERTIFICATE OF CORRECTION

| | | |
|---|---|---|
| PATENT NO. | : 8,077,365 B2 | Page 1 of 1 |
| APPLICATION NO. | : 12/182095 | |
| DATED | : December 13, 2011 | |
| INVENTOR(S) | : Adrian Cable | |

It is certified that error appears in the above-identified patent and that said Letters Patent is hereby corrected as shown below:

Column 25, Line 29, "second image data" should be changed to --second image data,--

Signed and Sealed this

Fourth Day of September, 2012

David J. Kappos
*Director of the United States Patent and Trademark Office*